US007317987B2

(12) United States Patent
Nahla

(10) Patent No.: US 7,317,987 B2
(45) Date of Patent: Jan. 8, 2008

(54) VEHICLE NAVIGATION, COLLISION AVOIDANCE AND CONTROL SYSTEM

(76) Inventor: Ibrahim Nahla, 1 Anglesea, 7 Mockridge Ave., Newington (AU) 2127

( * ) Notice: Subject to any disclaimer, the term of this patent is extended or adjusted under 35 U.S.C. 154(b) by 558 days.

(21) Appl. No.: 10/508,582

(22) PCT Filed: Mar. 21, 2003

(86) PCT No.: PCT/AU03/00342

§ 371 (c)(1),
(2), (4) Date: Dec. 9, 2004

(87) PCT Pub. No.: WO03/081514

PCT Pub. Date: Oct. 2, 2003

(65) Prior Publication Data

US 2005/0107954 A1    May 19, 2005

(30) Foreign Application Priority Data

Mar. 22, 2002  (AU) ................................ PS1237

(51) Int. Cl.
    *G06F 17/10* (2006.01)
(52) U.S. Cl. .................... 701/301; 701/19; 701/207
(58) Field of Classification Search .................. 701/1, 701/36, 19, 207–213, 300, 301; 246/2 R–14
    See application file for complete search history.

(56) References Cited

U.S. PATENT DOCUMENTS

| 4,072,945 A | 2/1978 | Katsumata et al. |
| 4,403,220 A | 9/1983 | Donovan |
| 4,894,655 A | 1/1990 | Joguet et al. |
| 4,926,171 A | 5/1990 | Kelley |
| 4,969,038 A | 11/1990 | Lemelson |
| 4,979,029 A | 12/1990 | Lemelson |
| 5,039,217 A | 8/1991 | Maekawa et al. |
| 5,081,585 A | 1/1992 | Kurami et al. |
| 5,091,726 A | 2/1992 | Shyu |
| 5,148,179 A | 9/1992 | Allison |
| 5,153,836 A | 10/1992 | Fraughton et al. |
| 5,161,107 A | 11/1992 | Mayeaux et al. |
| 5,165,497 A | 11/1992 | Chi |
| 5,177,462 A | 1/1993 | Kajiwara |
| 5,177,489 A | 1/1993 | Hatch |
| 5,181,038 A | 1/1993 | Asbury et al. |
| 5,182,566 A | 1/1993 | Ferguson et al. |
| 5,187,805 A | 2/1993 | Bertiger et al. |
| 5,189,426 A | 2/1993 | Asbury et al. |
| 5,202,829 A | 4/1993 | Geier |
| 5,223,844 A | 6/1993 | Mansell et al. |
| 5,225,842 A | 7/1993 | Brown et al. |
| 5,243,652 A | 9/1993 | Teare et al. |
| 5,249,157 A | 9/1993 | Taylor |
| 5,272,483 A | 12/1993 | Kato |

(Continued)

*Primary Examiner*—Richard M. Camby
(74) *Attorney, Agent, or Firm*—Greenblum & Bernstein, P.L.C.

(57) ABSTRACT

A collision warning and avoidance system which comprising an integrated on-board Train Navigation Unit (3) and a GPS Interface Subsystem to locate a train. The system includes a GPS (2) location signal, at least one fixed transponder station (31) and a calibrated, rectified transponder identification subsystem for scanning the track based transponders for override of train controls in the event of a collision risk and further comprising a database of all transponders, their location and the track ID on which they are located. Data and information are computer processed and analysed in neural networks in one train to identify, rank, and evaluate collision hazards.

36 Claims, 13 Drawing Sheets

Train Navigation and Control System TNCS.

U.S. PATENT DOCUMENTS

| | | |
|---|---|---|
| 5,291,196 A | 3/1994 | Defour |
| 5,302,956 A | 4/1994 | Asbury et al. |
| 5,311,194 A | 5/1994 | Brown |
| 5,314,037 A | 5/1994 | Shaw et al. |
| 5,323,322 A | 6/1994 | Mueller et al. |
| 5,325,302 A | 6/1994 | Izidon et al. |
| 5,332,057 A | 7/1994 | Butsuen et al. |
| 5,341,344 A | 8/1994 | O'Brien et al. |
| 5,345,244 A | 9/1994 | Gildea et al. |
| 5,359,332 A | 10/1994 | Allison et al. |
| 5,361,212 A | 11/1994 | Class et al. |
| 5,367,463 A | 11/1994 | Tsuji |
| 5,369,591 A | 11/1994 | Broxmeyer |
| 5,379,224 A | 1/1995 | Brown et al. |
| 5,382,958 A | 1/1995 | FitzGerald |
| 5,383,127 A | 1/1995 | Shibata |
| 5,389,934 A | 2/1995 | Kass |
| 5,390,125 A | 2/1995 | Sennott et al. |
| 5,394,333 A | 2/1995 | Kao |
| 5,396,540 A | 3/1995 | Gooch |
| 5,408,238 A | 4/1995 | Smith |
| 5,416,712 A | 5/1995 | Geier et al. |
| 5,418,537 A | 5/1995 | Bird |
| 5,422,813 A | 6/1995 | Schuchman et al. |
| 5,422,816 A | 6/1995 | Sprague et al. |
| 5,430,656 A | 7/1995 | Dekel et al. |
| 5,434,787 A | 7/1995 | Okamoto et al. |
| 5,438,517 A | 8/1995 | Sennott et al. |
| 5,442,363 A | 8/1995 | Remondi |
| 5,463,384 A | 10/1995 | Juds |
| 5,467,072 A | 11/1995 | Michael |
| 5,479,173 A | 12/1995 | Yoshioka et al. |
| 5,486,832 A | 1/1996 | Hulderman |
| 5,504,482 A | 4/1996 | Schreder |
| 5,506,584 A | 4/1996 | Boles |
| 5,529,138 A | 6/1996 | Shaw et al. |
| 5,530,651 A | 6/1996 | Uemura et al. |
| 5,572,428 A | 11/1996 | Ishida et al. |
| 5,576,972 A | 11/1996 | Harrison |
| 5,585,798 A | 12/1996 | Yoshioka et al. |
| 5,606,506 A | 2/1997 | Kyrtsos |
| 5,613,039 A | 3/1997 | Wang et al. |
| 5,620,155 A | 4/1997 | Michalek |
| 5,757,646 A | 5/1998 | Talbot et al. |
| 5,983,161 A | 11/1999 | Lemelson et al. |
| 6,275,773 B1 | 8/2001 | Lemelson et al. |
| 6,865,454 B2 * | 3/2005 | Kane et al. .................. 701/19 |

* cited by examiner

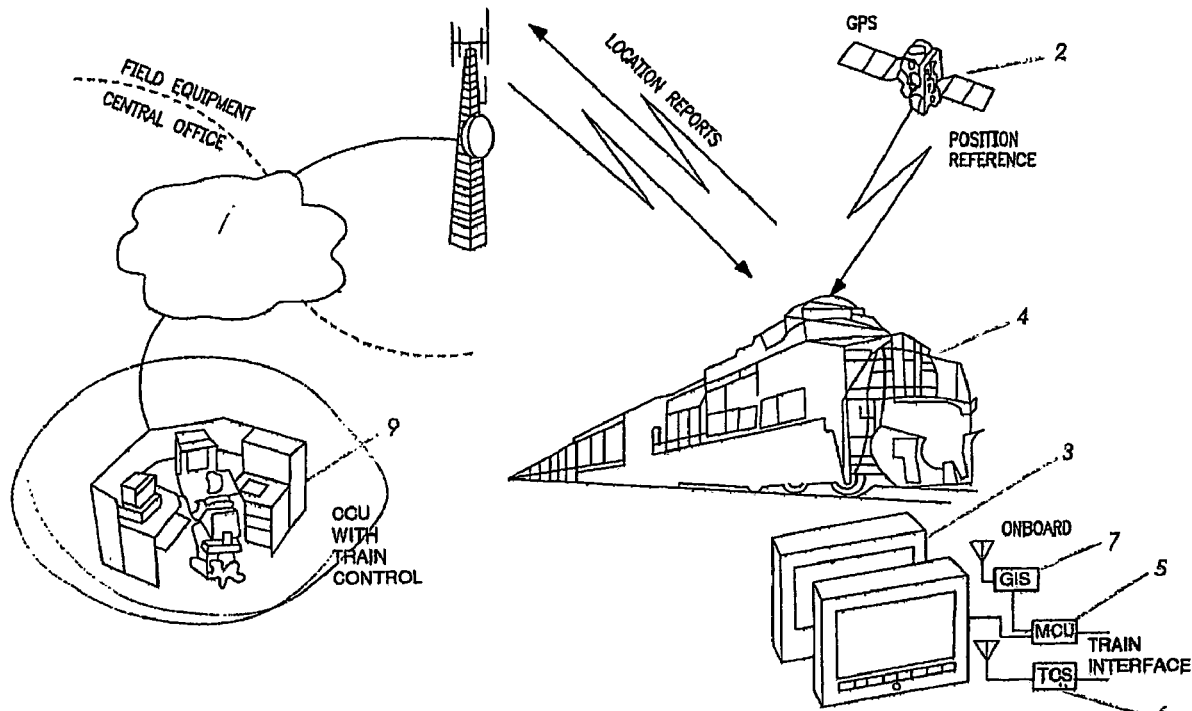
FIG. 1
Train Navigation and Control System TNCS.
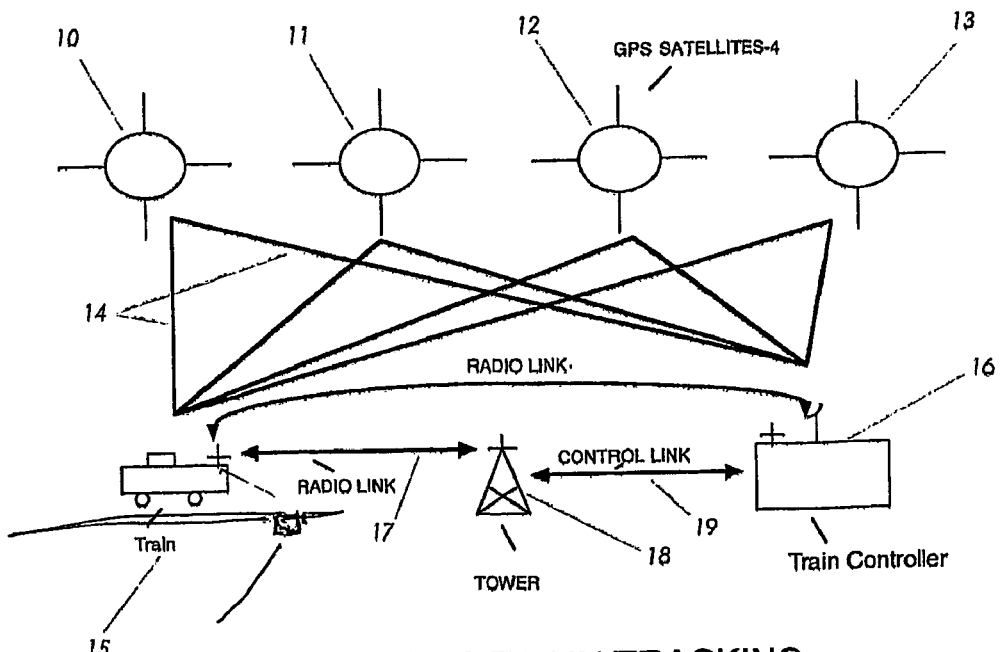
FIG. 2 GPS TRAIN TRACKING TRAIN TNUs COMMUNICATE WITH EACH OTHER

GPS INTERFACE SUBSYSTEM UNITS ARE FITTED ON THE TRAIN EXTREMISTS

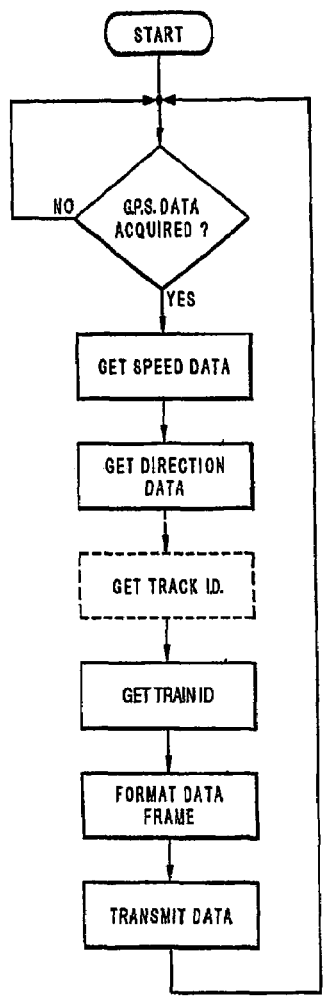
FIG. 5  DATA FLOW CHART
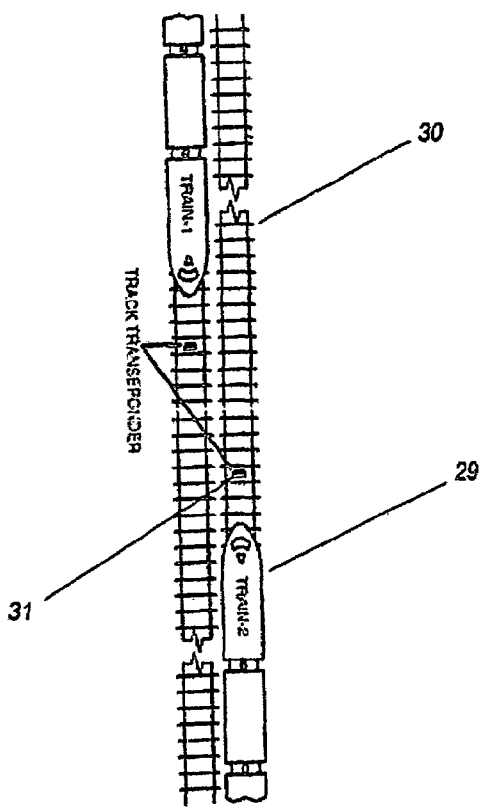
FIG. 6  TRACK TRANSPONDERS

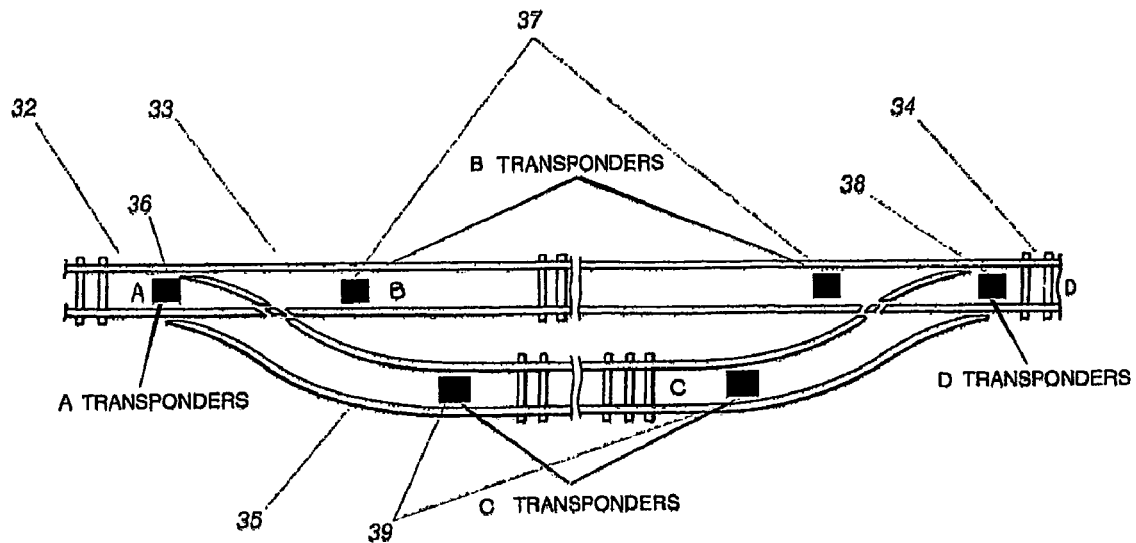
FIG. 7   TRACK TRANSPONDERS
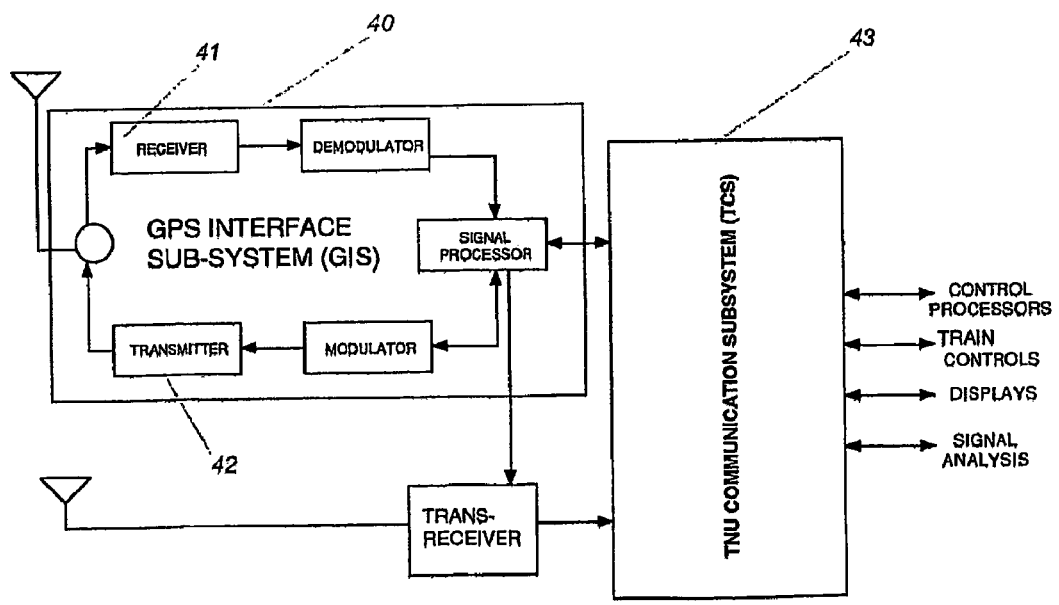
FIG. 8   TRAIN GPS RADIO SYSTEM

P.E. $(x_{EOB})$ + Fb $(x_{EOB}-x)$ = 1/2 M$v^2$ (x) + P.E. (x)
- Fb BRAKING FORCE ASSUMED CONSTANT AT FULL SERVICE APPLICATION
- M TOTAL TRAIN MASS
- V VELOCITY AT START OF BRAKING
- P.E. POTENTIAL ENERGY OF TRAIN  = $\sum_n w_n h_n$
- n NUMBER OF CARS AND LOCOMOTIVES

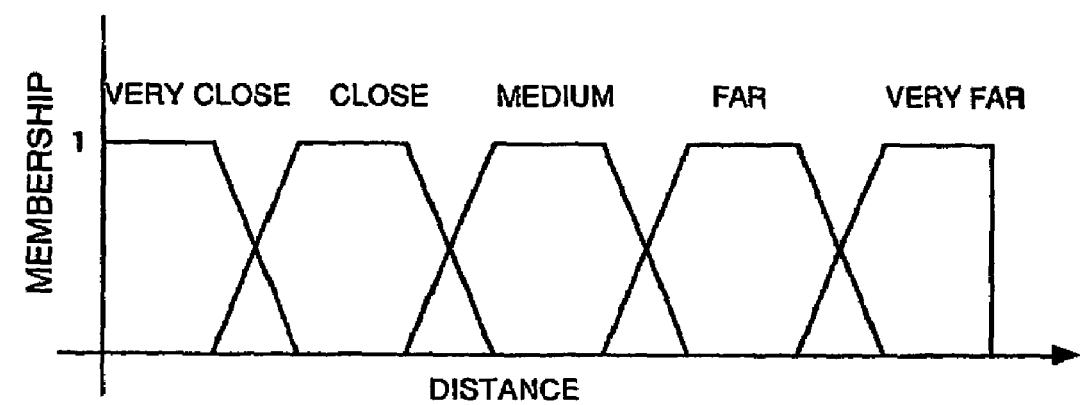
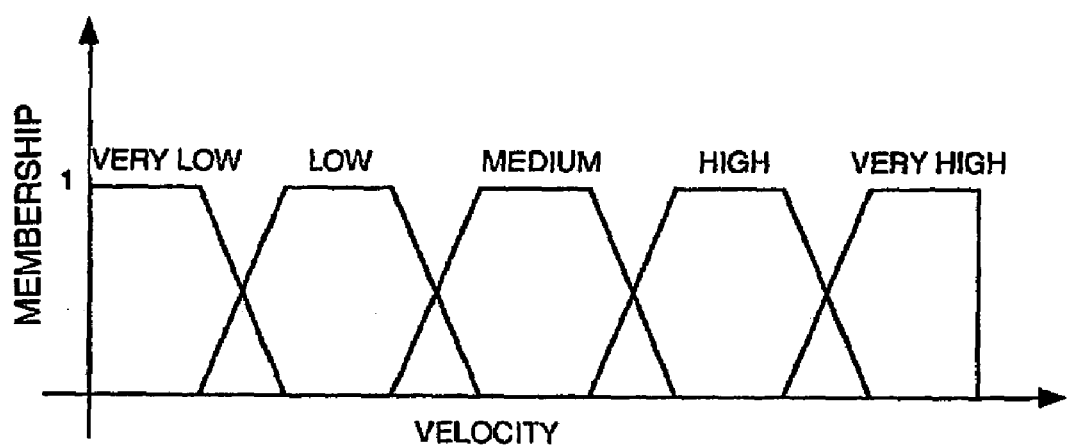
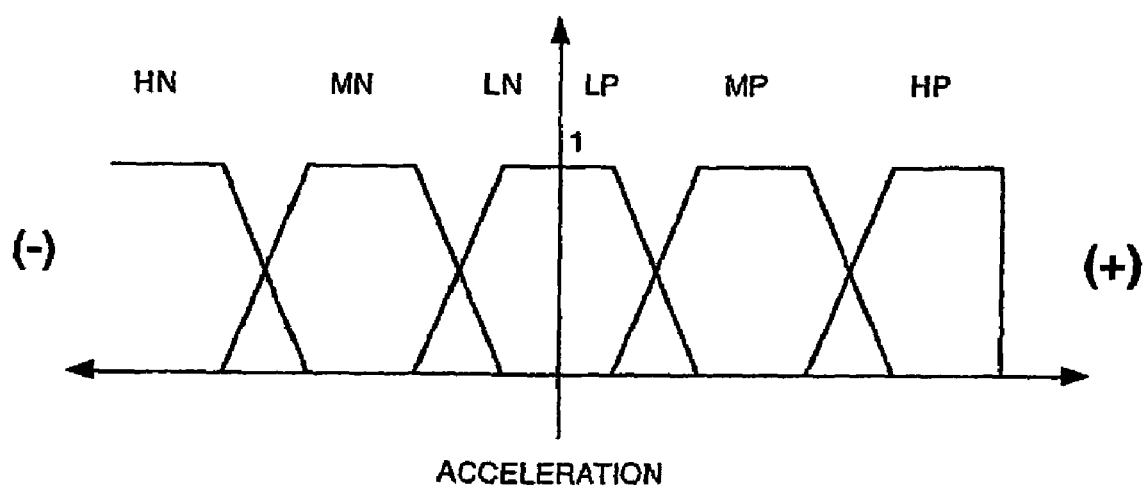
FIG. 11

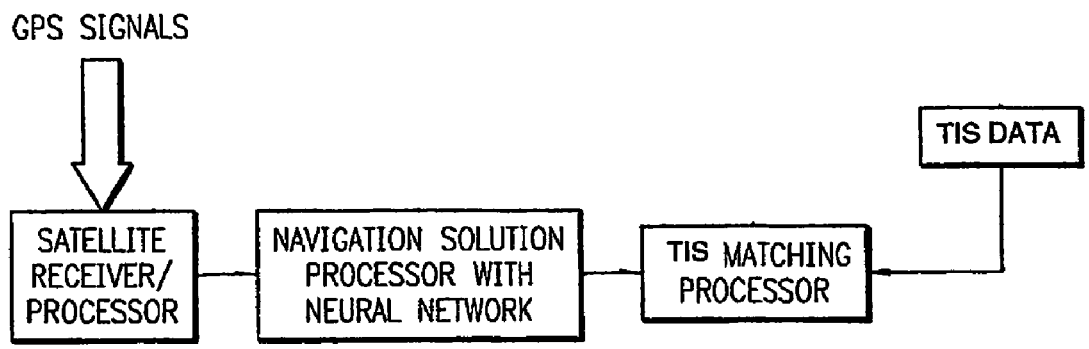
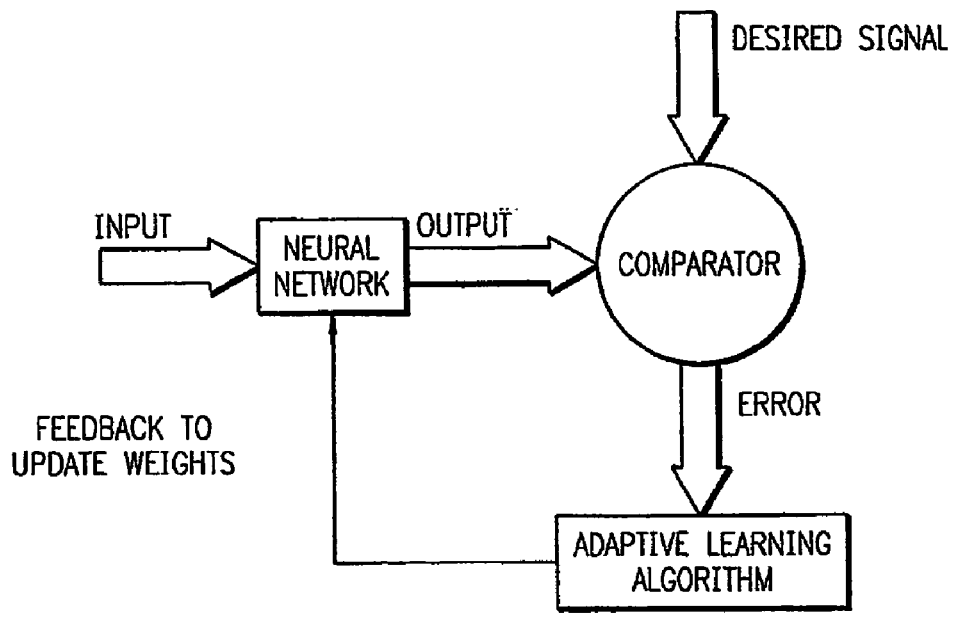
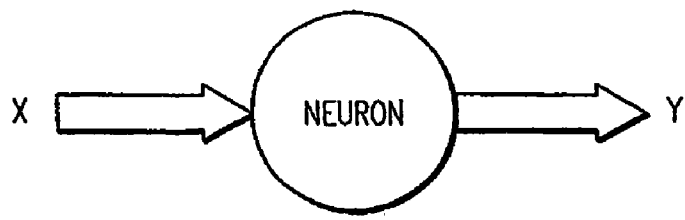
FIG. 14

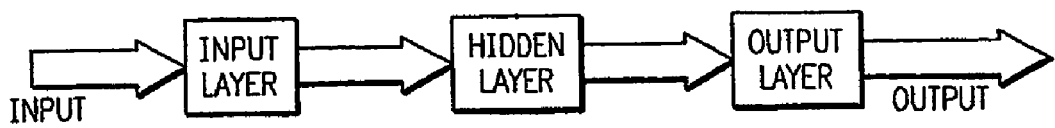
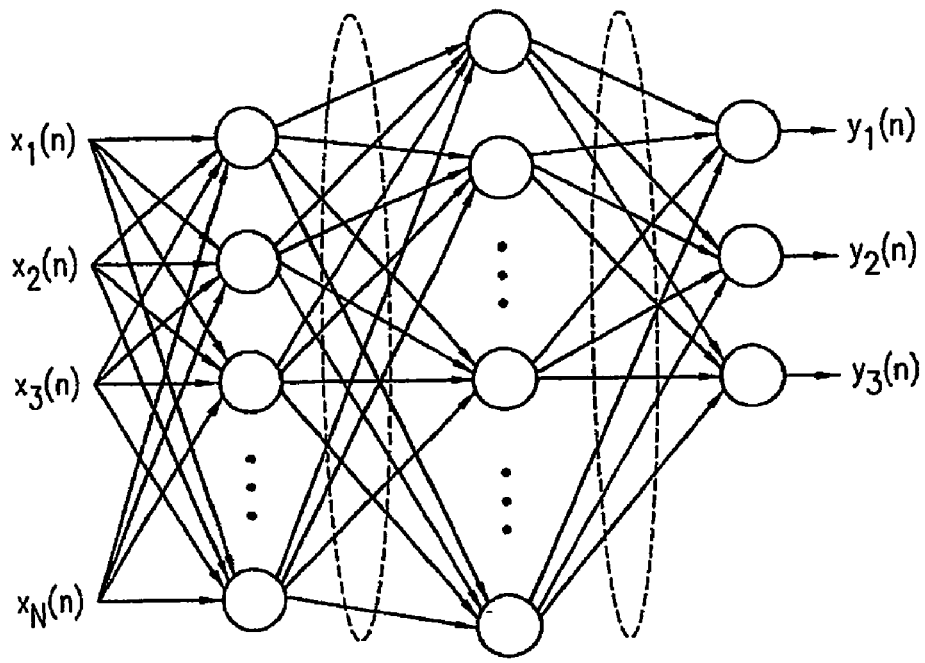
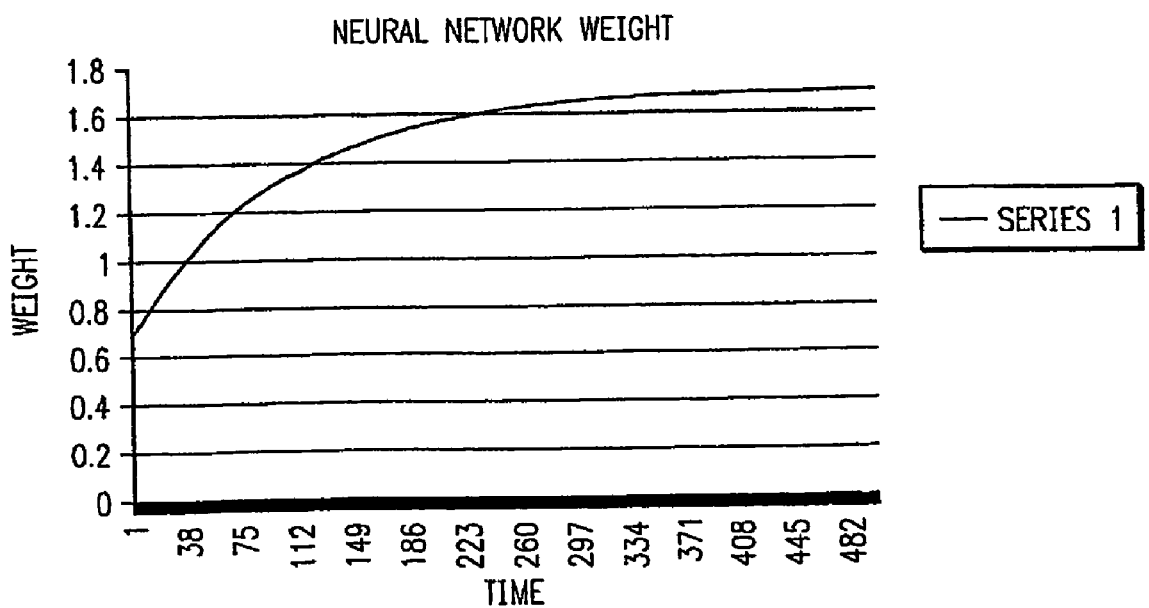
FIG. 15

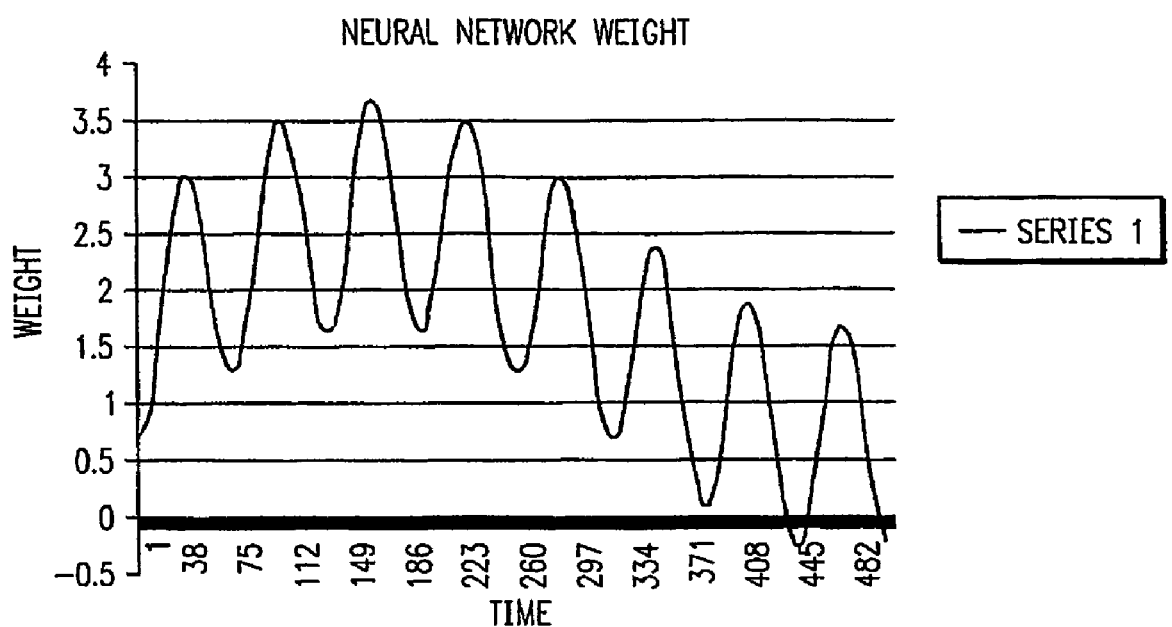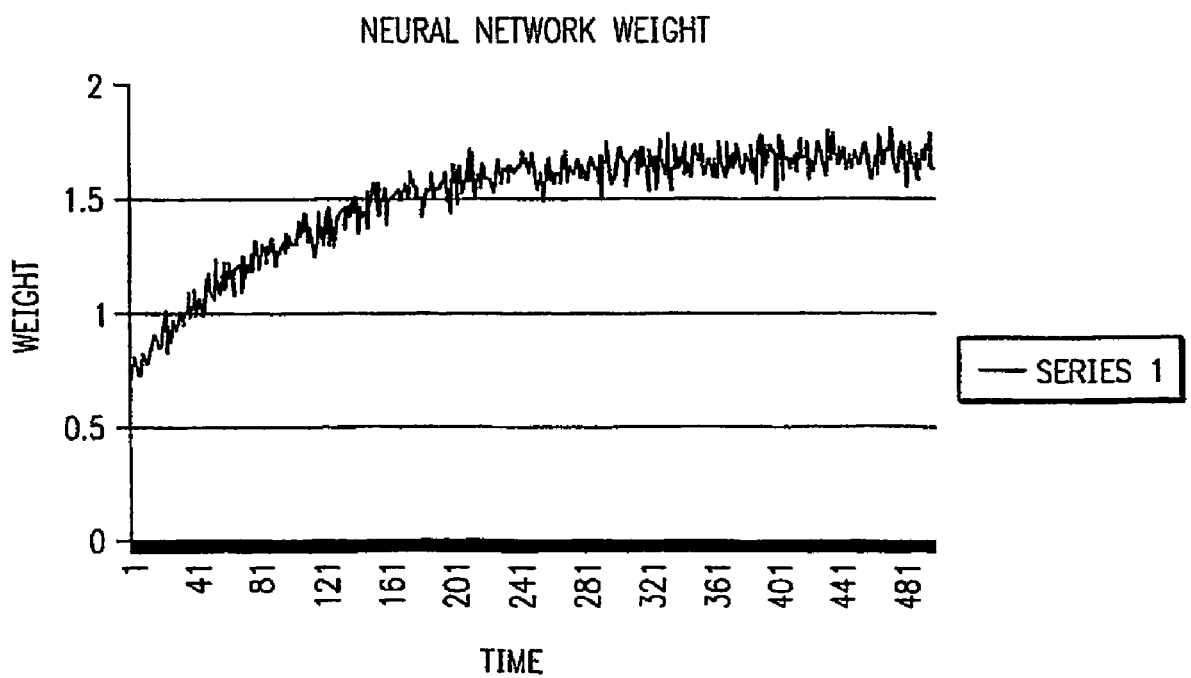
FIG. 16

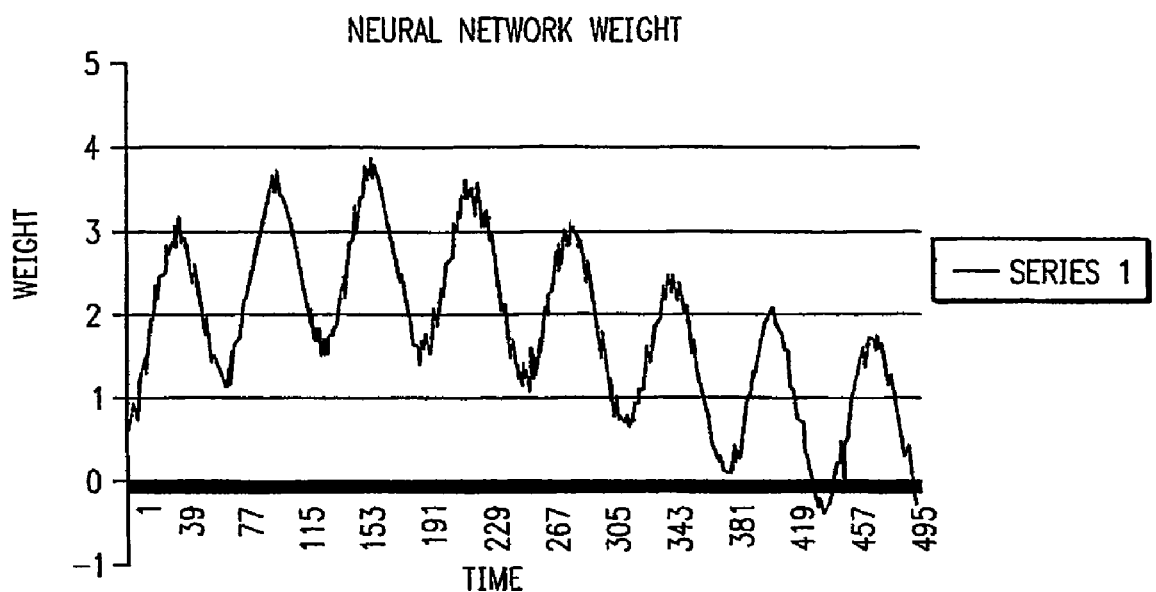
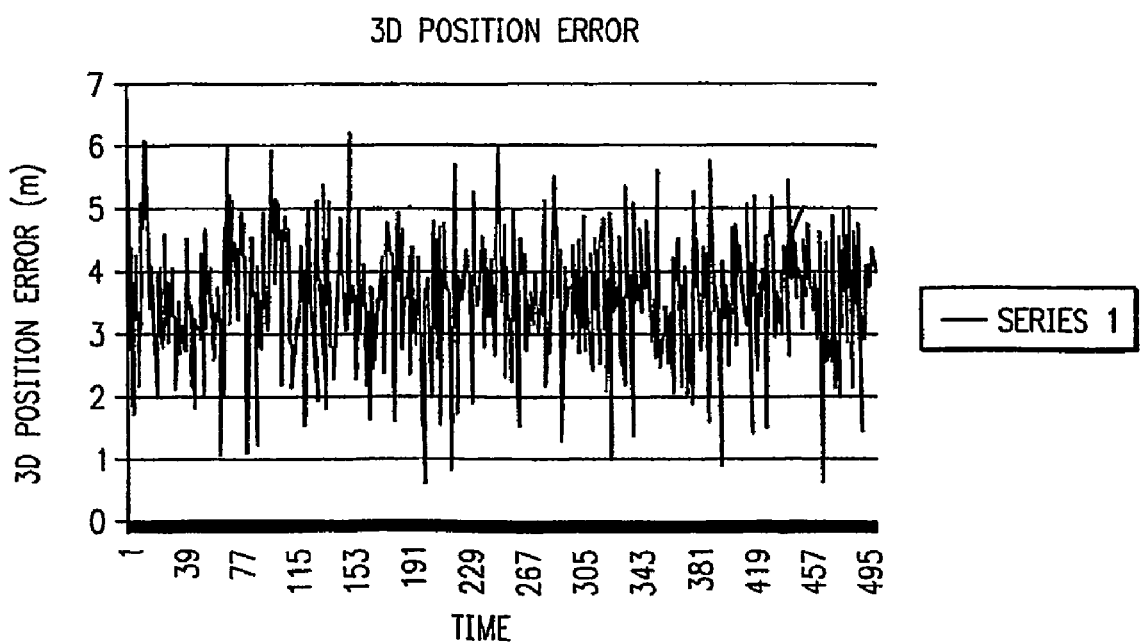
FIG. 17

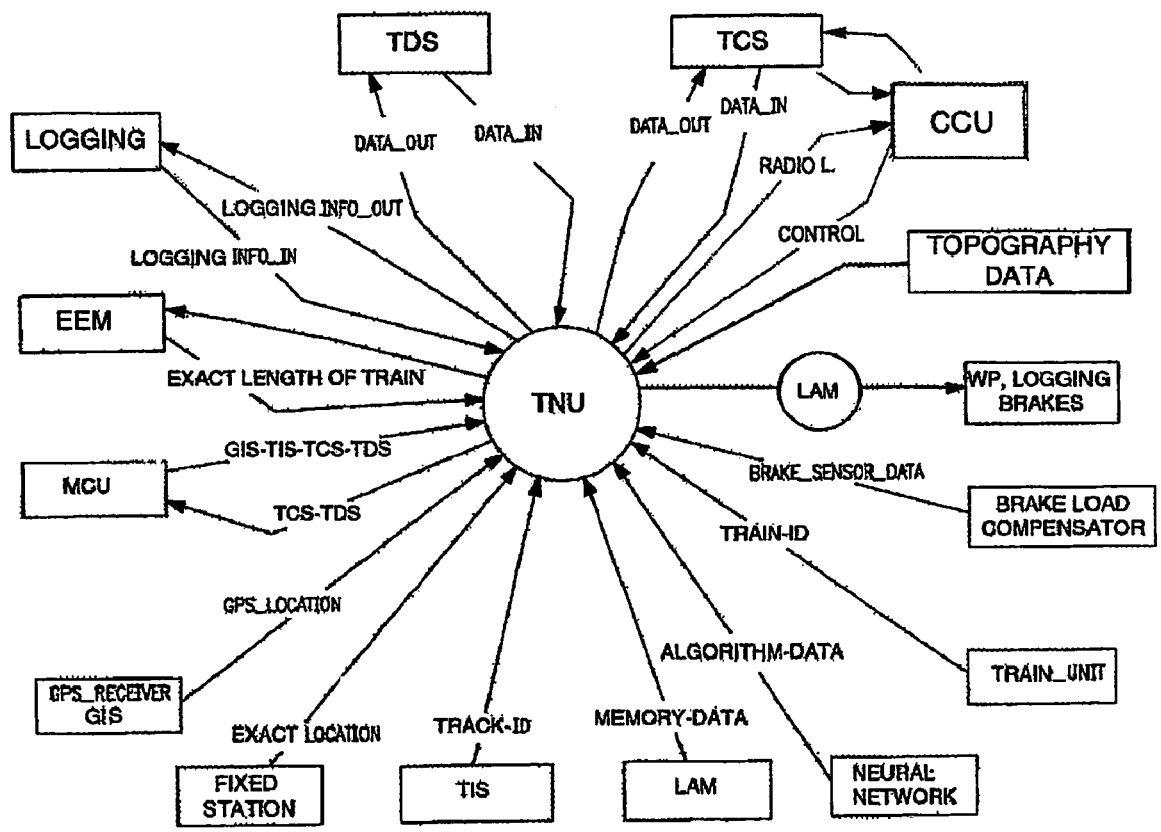
FIG. 18  TNU INPUTS AND OUTPUTS

VEHICLE NAVIGATION, COLLISION AVOIDANCE AND CONTROL SYSTEM

This application is a 371 U.S. national stage application of international application PCT/AU03/00342 filed on Mar. 21, 2003, which claims priority of Australian patent application PS 1237 filed on Mar. 22, 2002.

BACKGROUND

The present invention relates to vehicle safety and more particularly relates to an identification system capable of vehicle collision warning and avoidance and More particularly the invention relates to collision avoidance systems for track networks including means to allow vehicle and track identification. More particularly the present invention relates to anticipatory detection and transmission of a vehicle location in a network for the purpose of avoidance of a collision between two or more vehicles in the network. Although the invention to be described herein is adaptable to a variety of vehicle networks, it will primarily be described with reference to its application to rail cars in rail networks.

PRIOR ART

There are in existence a variety of vehicle collision avoidance systems for both road and rail traffic. The complete disclosure of the following patents is incorporated by reference herein in their entirety.

U.S. Pat. No. 5,272,483 to Kato describes an automobile navigation system. This invention attempts to correct inaccuracies in the GPS system through the use of an inertial guidance, geomagnetic sensor, or vehicle crank shaft speed sensor.

U.S. Pat. Nos. 5,314,037 and 5,529,138 to Shaw et al. describe a collision avoidance system using laser radar and a laser gyroscope. The following paragraphs are quoted from U.S. Pat. No. 5,314,037 that provides a background to collision avoidance prior art. "The use of radars in collision avoidance systems is generally known. U.S. Pat. No. 4,403,220 which discloses a radar system adapted to detect relative headings between aircraft or ships at sea and a detected object moving relative to the ground. The system is adapted to a collision avoidance application. U.S. Pat. No. 4,072,945 dated Feb. 7, 1978 discloses a radar operated collision avoidance system for roadway vehicles. The system senses the vehicle speed relative to an object and its distance and decides whether the vehicle is approaching the object at a dangerously high speed. A minimum allowable distance represented by a digital code is stored in a memory of a computer and the minimum allowable distance is compared with the distance sensed by the radar."

Many of the prior art collision avoidance systems use microwave radars as a ranging and detecting device. There are multiple disadvantages of these automobile collision avoidance systems when microwave radars are used. One major disadvantage is related to the beam width, that is the angular width of the main lobe of the radar, and the associated angular resolution of the microwave radar. The beam width is inversely proportional to the antenna diameter in wavelength. With the limitation of the antenna size, it is very difficult to make a reasonable size microwave radar with beam width less than 3 degrees. At the desired scanning distance, this beam width will scan an area that is much too big and thus is too nonspecific and difficult to differentiate the received echoes. Besides getting echo from another car in front of it, this radar will also receive echoes from roadside signs, trees or posts, or bridges overpassing an expressway. On highways with divided lanes the microwave radar will receive echoes from cars 2 or 3 lanes away and has difficulty to in differentiating them from echoes coming from objects in the same lane. Because of the poor angular resolution of microwave radars, the direction of objects cannot be specifically determined and objects too close to one another cannot be separated. The angular resolution of microwave radars is not small enough for them to be effectively used to monitor roadway traffic. The other disadvantage is that the microwave radars have difficulty in distinguishing radar signals coming from adjacent cars with similar equipment. If there are more than two cars with the same radar equipment on the same scene, the signals become very confusing.

In the Shaw invention laser radars are used as scanning and ranging devices. These laser radar devices have much smaller beam and angular resolution and give more specific and precise information of the detected object's direction and distance.

Radars have been used widely in detection of speed and distance of moving objects. Most radars use electromagnetic waves in the microwave frequency range. They are divided into pulse radars and continuous radars. In a pulse radar, the transmitter sends out radar signals through the antenna in pulses with extremely short duration, millionth of a second for example. The next pulse is emitted after the echoes have been received. The radars use Doppler principle to calculate the speed by the amount of frequency shift. The angular resolution of a radar depends on the beam width. If two targets are at about the same distance but at slightly different angles, they can be separated if they are more than one beam width apart. Laser light is highly directional. The laser light travels as a parallel beam and spreads very little. It can travel in very narrow beams. In comparison to microwave, laser light has higher frequency and shorter wavelength. Laser light can be used to measure speed and distance in the same way as the microwave radar.

The laser beams are highly directional. The laser receiving equipment are also highly directional. Since the laser receiving equipment will receive only the laser beams aimed at it, most interference can be avoided. This is an important advantage over the microwave radar. When there are multiple cars with the same laser radars at the same scene, their reflected signals will not interfere with each other. Confusion can be easily avoided.

The laser gyroscope is the modern type of gyroscope with higher degree of accuracy, cheaper and much smaller than the traditional mechanical gyroscope. It can give directional information precisely. A typical laser gyroscope is made of glass-like material and is shaped like a triangle or a rectangle. A laser beam is generated and split into two parts that travel in opposite directions around the triangle or rectangle. Laser gyroscope has been used by airlines as automatic pilots to keep the airplanes on course. If the aircraft moves off course, the movement to one side will make one laser beam travel further than the other. Computer can analyze how much the laser beams are out of step and compute the plane's change in direction. Therefore, laser gyroscope can sense the rotation rate or direction change rate accurately.

Laser lights do not penetrate rain, sandstorm, fog or snow, etc. as well as microwave radar. However, infrared light will penetrate rain, sandstorm, fog or snow better than the visible light. Therefore, the rain or snow, etc. will affect the driver's vision much more than they affect the infrared laser radar. If the rain or snow etc. are heavy enough, they may reduce the effective range of the laser radar. With highly directional character and with very small beam width, laser radars have other advantages as compared with microwave radars.

The receiver of the laser radar is aimed at exactly the same direction as the associated transmitter. The receiver is also highly directional. The receiver will not receive the reflected back laser light emitted from other transmitters on the same vehicle or from transmitters on adjacent vehicles because ordinarily the other laser light reflection will come in a direction different from the receivers direction, with the following two very rare and brief exceptions. The first exception is that confusion may occur when an oncoming vehicle's laser beam happen to aim at the system-equipped vehicle's receiver. In two moving cars this situation will last at most only a minimal fraction of a second. A second exception is that confusion may occur when an adjacent vehicle's laser beam happens to illuminate at the same spot as the spot illuminated by the system-equipped vehicle's laser beam. Then the reflected laser light from the adjacent vehicle may come in the right direction for the system-equipped vehicle's receiver.

Shaw, in these patents, relies on two laser radar systems in order to get an accurate prediction of the location of the vehicle on the roadway using triangulation. No image of vehicles or other objects on the roadway is formed. No attempt is made to identify the illuminated object. Shaw uses triangulation from two laser radars to obtain the relative velocity of the object being interrogated.

U.S. Pat. No. 5,367,463 to Tsuji describes a vehicle azimuth determining system. It uses regression lines to find vehicle on map when there are errors in the GPS and map data. The advantage of this invention is that it shows a method of combining both map matching data and GPS along with a gyro and a vehicle velocity and odometer data to improve the overall location accuracy of the vehicle.

U.S. Pat. No. 5,383,127 to Shibata uses map matching algorithms to correct for errors in the GPS navigational system to provide a more accurate indication of where the vehicle is or, in particular, on what road the vehicle is. The main purpose of the system is for navigation and, in particular, in determining the road on which the vehicle is traveling.

U.S. Pat. No. 5,416,712 to Geier, et al. relates generally to navigation systems and more specifically to global positioning systems that use dead reckoning apparatus to fill in as backup during periods of GPS shadowing such as occur amongst obstacles, e.g., tall buildings in large cities.

U.S. Pat. No. 5,463,384 to Juds uses a plurality of infrared beams to alert a truck driver that a vehicle is in his blind spot when he begins to turn the vehicle. The system is typically activated by the vehicle's turn signal. No attempt is made to measure exactly where the object is, only whether it is in the blind spot or not. U.S. Pat. No. 5,467,072 to Michael relates to a phased array radar system that permits the steering of a radar beam without having to rotate antennas. Aside from that, it suffers from all the disadvantages of radar systems as described above. In particular, it is not capable of giving accurate three-dimensional measurements of an object on the roadway.

U.S. Pat. No. 5,479,173 to Yoshioka, et al. uses a steering angle sensor, a yaw rate sensor and a velocity of the vehicle sensor to predict the path that the vehicle will take. It uses a radar unit to identify various obstacles that may be in the path of the vehicle, and it uses a CCD camera to try to determine that the road is changing direction in front of the vehicle. No mention is made of the accuracy with which these determinations are made. It is unlikely that sub-meter accuracy is achieved. U.S. Pat. No. 5,486,832 to Hulderman employs millimeter wave radar and optical techniques to eliminate the need for a mechanical scanning system.

U.S. Pat. No. 5,504,482 to Schreder discloses an automobile equipped with an inertial and satellite navigation system as well as a local area digitized street map. The main use of this patent is for route guidance in the presence of traffic jams, etc. This patent describes how information as to the state of the traffic on a highway can be transmitted and utilized by a properly equipped vehicle to change the route the driver would take in going to his destination. Nevertheless, this patent provides a good picture of the state of the art as can be seen from the following quoted paragraphs:

There are in existence sytems which improve vehicular control and increase safety associated with the common automobile usage. For example, it is known that gyro based inertial navigation systems have been used to generate three-dimensional position information, including accurate acceleration and velocity information over a relatively short travel distance, and that GPS satellite positioning systems can provide three-dimensional vehicular positioning. The prior art has failed to integrate some of the known technologies in a comprehensive fashion to provide a complete collision warning and avoidance system.

GPS satellite reception has been used in intelligent vehicle highway systems to enhance vehicular tracking on digitized road maps as part of a guidance and control system. These systems use GPS to determine when drift errors become excessive and to indicate that recalibration is necessary. However, the GPS reception is not to the best of the applicant's knowledge used for automatic accurate recalibration of current vehicular positioning.

These Intelligent Vehicle Highway Systems use the compass and wheel sensors for vehicular positioning for route guidance, but do not use accurate GPS and inertial route navigation and guidance and do not use inertial measuring units for dynamic vehicular control. Even though dynamic electronic vehicular control, for example, anti-lock braking, anti-skid steering, and electronic control suspension have been contemplated, these systems do not functionally integrate these dynamic controls with an accurate inertial route guidance system having an inertial measuring unit well suited for dynamic motion sensing.

There remains a long felt want to provide an integrated vehicle collision warning system which allows an operator of one vehicle to know the specific location of at least one other vehicle in its vicinity to thereby allow collision warning in the event that vehicles are on a collision course.

A known system for preventing vehicle accidents, provides position determining means for determining the absolute position of a first vehicle. The position determining means comprises a receiver arranged in the first vehicle and structured and arranged to receive position data from a GPS satellite network and receive wide-area differential GPS correction data. The system also includes a memory for storing data relating to edges of roadways on which the first vehicle may travel. A processor is coupled to the determining means and the memory for comparing the absolute position of the first vehicle as determined upon the reception of the position data from the satellite network and wide-area differential GPS correction data by the receiver to the edges of the roadway in order to determine the location of the first vehicle relative to the edges of the roadway reaction means coupled to the processor for affecting a system on the first vehicle when the location of the first vehicle approaches close to an edge of the roadway or intersects with an edge of the roadway. This system also includes a communication device arranged in the first vehicle and coupled to the processing means for receiving a communication of data including at least one of the size, type, mass and orientation of other vehicles, said processing means being structured and arranged to determine whether another vehicle is likely to impact the first vehicle in a manner requiring defensive action based at least in part on the at least one of the size, type, mass and orientation of the other vehicle and if so, affecting another system in the vehicle to initiate a warning or defensive action. This system provides vehicle to vehicle communications but does not provide a system which allows a vehicle to determine its location relative to fixed positions on a road or track. That system also suffers from the disadvantage of data storage problems due to unlimited data to be uploaded and stored including road edge detail for every edge for every road and from each angle and direction. This is impractical to implement and fails to address any changes in road configurations i.e.: new structures like new round abouts or new road islands or emergency works such as excavations and/or road maintenance. Also this known system does not distinguish navigation under bridges or multiple store roads or tunnels.

U.S. Pat. No. 5,506,584 to Boles relates to a system for communication between vehicles through a transmit and transponder relationship. The patent mentions that there may be as many as 90 vehicles within one half mile of an interrogation device in a multi-lane environment, where many of them may be at the same or nearly the same range. The Boles patent utilizes a transponder device, the coded responses which are randomized in time and an interrogation device which processes the return signals to provide vehicle identification speed, location and transponder status information on vehicles to an operator or for storage in memory. No mention is made of how a vehicle knows its location and therefore how it can transmit that location to other vehicles.

U.S. Pat. No. 5,530,651 to Uemura, et al. discloses a combination ultrasonic and laser radar optical detection system which has the feature that if the ability of the system to detect an obstacle decreases due to soiled lenses, rain, snow, etc., then the vehicle control system automatically limits the speed, for example, that the vehicle can travel in the adverse weather conditions. The speed of the vehicle is also reduced when the visibility ahead is reduced due to a blind, curved corner.

U.S. Pat. No. 5,576,972 to Harrison provides a good background of how neural networks are used to identify various of objects. Although not directly related to intelligent transportation systems or accident-avoidance systems, these techniques will be applied to the invention described herein as discussed below.

U.S. Pat. No. 5,585,798 to Yoshioka, et al. uses a combination of a CCD camera and a laser radar unit. The invention attempts to make a judgment as to the danger of each of the many obstacles that are detected. The load on the central processor is monitored by looking at different obstacles with different frequencies depending on their danger to the present system. A similar arrangement is contemplated for the invention as disclosed herein.

U.S. Pat. No. 5,572,428 to Ishida is concerned with using a radar system plus a yawl rate sensor and a velocity sensor to determine whether a vehicle will collide with another vehicle based on the area occupied by each vehicle. Naturally, since radar cannot accurately determine this area it has to be assumed by the system.

U.S. Pat. No. 5,606,506 to Kyrtsos teaches a background to the GPS satellite system. It discloses a method for improving the accuracy of the GPS system using an inertial guidance system. This is based on the fact that the GPS signals used by Kyrtsos do not contain a differential correction and the selective access feature is on. Key paragraph from this application that is applicable to the instant invention follow.

There already exists a terrestrial position determination system, referred to generically as a global positioning system (GPS). A GPS is a satellite-based radio-navigation system that is intended to provide highly accurate three-dimensional position information to receivers at or near the surface of the Earth. This general capability is integrated in the present invention as part of a collision warning system. Triangulation, using at least three orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for clock bias. If a receiver's clock were precisely synchronized with that of the GPS satellites, then the fourth satellite would not be necessary.

In addition to the clock error, the atmospheric error and errors from selective availability, other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system.

U.S. Pat. No. 5,613,039 to Wang, et al. is a collision warning radar system utilizing a real time adaptive probabilistic neural network. Wang discloses that 60% of roadway collisions could be avoided if the operator of the vehicle was provided warning at least one-half second prior to a collision. The radar system used by Wang consists of two separate frequencies. The reflective radar signals are analyzed by a probabilistic neural network that provides an output signal indicative of the likelihood and threat of a collision with a particular object. The system further includes a Fourier transform circuit that converts the digitized reflective signal from a time series to a frequency representation. It is important to note that in this case, as in the others above, true collision avoidance will not occur since, without a knowledge of the roadway, two vehicles can be approaching each other on a collision course, each following a curved lane on a highway and yet the risk of collision is minimal due to the fact that each vehicle remains in its lane. Thus, true collision avoidance cannot be obtained without an accurate knowledge of the road geometry.

U.S. Pat. No. 5,757,646 to Talbot, et al. illustrates the manner in which centimeter level accuracy on the fly in real time is obtained. It is accomplished by double differencing the code and carrier measurements from a pair of fixed and roving GPS receivers. Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. GPS signal transmissions are on two synchronous, but separate carrier frequencies "L1" and "L2", with wavelengths of nineteen and twenty-four centimeters, espectively. Thus within nineteen or twenty-four centimeters, the phase of the GPS carrier signal will change 360.degree.

There are numerous prior art methods for resolving integer ambiguities. These include integer searches, multiple antennas, multiple GPS observables, motion-based approaches, and external aiding. Search techniques often require significant computation time and are vulnerable to erroneous solutions or when only a few satellites are visible. More antennas can improve reliability considerably. If carried to an extreme, a phased array of antennas results whereby the integers are completely unambiguous and searching is unnecessary.

But for economy the minimum number of antennas required to quickly and unambiguously resolve the integers, even in the presence of noise, is preferred.

Work has been done to develop a target recognition system. Neural networks pay a key role in that target recognition process. The recognition of vehicles on a roadway is a considerably simpler process. Through range gating, most of the cluttering information can be eliminated. Road and Intersection Detection and Traversal, "IEEE Conference on Intelligent Robots and Systems, Aug. 5-9, 1995, Pittsburgh, Pa., USA) describes an autonomous land vehicle using a neural network. The neural network is trained based on how a driver drives the vehicle given the output from a video camera. The output of the neural network is the direction that the vehicle should head based on the input information from the video camera and the training based on what a good driver would have done. Such a system can be used in the present invention to guide a vehicle to a safe stop in the event that the driver becomes incapacitated or some other emergency situation occurs wherein the driver is unable to control the vehicle. The input to the neural network in this case would be the map information rather than a video camera. Additionally, the laser radar imaging system could also be an input to the system. This neural network system could also take over in the event that an accident becomes inevitable.

Rail disasters in recent years have highlighted that the current state of the rail networks is no longer accepted worldwide. There seems to be a growing acceptance of the fact that the network and the service are in urgent need of major work to be done. Major improvements are needed in regards to safety, reliability, communications and the current culture. Train accidents are one of the most serious problems faced by our society, both in terms of personal deaths and injuries, and in financial losses suffered as a result of accidents. Human suffering caused by death or injury from such accidents is immense. In addition, the costs of medical treatment, permanent injury to accident victims resulting in loss of life opportunities, and financial losses resulting from damage to trains and other valuable objects or structures involved in such accidents are staggering. Providing improved systems and methods to minimize such personal and financial losses is an urgent and very important problem deserving the highest possible priority. Increasing populations and increased use of railway networks worldwide with resulting increased congestion and complications on our railway system networks, makes development of improved control and warning systems for collision avoidance even more important. While many advances have been made in vehicle safety, including, for example, the use of seatbelts, airbags and more rigid and safer automobile body structures, much room for improvement exists in railway systems, in general, and in train-on-the-track warning and Control systems, in particular.

Positioning Self and Multiple Targets by GPS

For example, impressive advances have been made in various areas of technology that can be applied to the train collision avoidance and warning system problem. One dynamic area of rapid technological development exists today in the form of GPS satellite location and tracking systems. As described above many patents have been issued for various applications of GPS for locating and tracking objects, and for navigation purposes. Also, such GPS systems have been augmented with methods that provide higher accuracy with real time, kinematic positioning information for use in aircraft landing systems. Various configurations of GPS-based tracking and communication systems and methods are described in the following documents, each of which is incorporated in its entirety herein by reference: Logsdon, Tom, The Navstar Global Positioning System, Van Nostrand Reinhold, New York (1992), ISBN 0-422-010404-0; Leick, Alfred, GPS Satellite Surveying, John Wiley & Sons, New York (1990), ISBN 0-471-81990-5; Hum, Jeff, GPS—A Guide to the Next Utility, Trimble Navigation, Ltd., Sunnyvale, Calif. (1989); Hum, Jeff, Differential GPS Explained, Trimble Navigation Ltd., Sunnyvale, Calif. (1993); Singh, M. S. and Grewal, H. K., IEEE Intelligent Vehicle Symposium, September, (1995); Walter, T., et.al., Flight Trials of the Wide-Area Augmentation System (WAAS), ION GPS-94, September, (1994); Walter, T. and Euge, P., Weighted RAIM for Precision Approach, ION GPS-95, September, (1995); and Remondi U.S. Pat. No. 5,442,363; Okamoto U.S. Pat. No. 5,434,787; Dekel U.S. Pat. No. 5,430,656; Sprague U.S. Pat. No. 5,422,816; Schuchman U.S. Pat. No. 5,422,813; Penny U.S. Pat. No. 5,414,432; Smith U.S. Pat. No. 5,408,238; Gooch U.S. Pat. No. 5,396,540; Sennott U.S. Pat. No. 5,390,125; Kass U.S. Pat. No. 5,389,934; FitzGerald U.S. Pat. No. 5,382,958; Brown U.S. Pat. No. 5,379,224; Class U.S. Pat. No. 5,361,212; Allison U.S. Pat. No. 5,359,332: Bird U.S. Pat. No. 5,418,537; Izidon U.S. Pat. No. 5,325,302; Gildea U.S. Pat. No. 5,345,244; Brown U.S. Pat. No. 5,311,194; Mueller U.S. Pat. No. 5,323,322; Teare U.S. Pat. No. 5,243,652; Brown U.S. Pat. No. 5,225,842; Mansell U.S. Pat. No. 5,223,844; Geier U.S. Pat. No. 5,202,829; Bertiger U.S. Pat. No. 5,187,805; Ferguson U.S. Pat. No. 5,182,566; Hatch U.S. Pat. No. 5,177,489; Fraughton U.S. Pat. No. 5,153,836; Allison U.S. Pat. No. 5,148,179; Joguet U.S. Pat. No. 4,894,655.

Avoidance Determinations

A wide variety of mechanisms are well known for detecting targets and obstacles and for determining a wide variety of collision relevant parameters relative to the detected targets. The sensed and calculated information from the detected targets is employed in a wide variety of known contexts to avoid collision. Such known systems include a wide variety of optical, electro-optical, radar, lidar, and magnetic sensor and video imaging devices, including Maekawa U.S. Pat. No. 5,039,217; Taylor U.S. Pat. No. 5,249,157; Kajiwara U.S. Pat. No. 5,177,462; DeFour U.S. Pat. No. 5,291,196; Lemelson U.S. Pat. No. 4,979,029; Lemelson U.S. Pat. No. 4,969,038; Kelley U.S. Pat. No. 4,926,171; O'Brien U.S. Pat. No. 5,341,344; Shaw U.S. Pat. No. 5,314,037; Asbury U.S. Pat. No. 5,189,426; Asbury U.S. Pat. No. 5,181,038; Asbury U.S. Pat. No. 5,302,956; Butsuen U.S. Pat. No. 5,332,057; Broxmeyer U.S. Pat. No. 5,369,591; Shyu U.S. Pat. No. 5,091,726; Chi U.S. Pat. No. 5,165,497; Mayeau U.S. Pat. No. 5,161,107; Kurami U.S.

Pat. No. 5,081,585; Schwarzinger, Michael, Vision-Based Car-Following: Detection, Tracking, and Identification 7/92, pgs. 24-29; Yu, Xuan, Road Tracking, Lane Segmentation and Obstacle Recognition by Mathematical Morphology, 7/92, pgs. 166-172; Ulmer, Berhold, VITA-An Autonomous Road Vehicle (ARV) for Collision Avoidance in Traffic, 7/92, pgs. 36-41; Ulmer, Berhold, Autonomous Automated Driving in Real Traffic, 12/94, pgs. 2118-2125; Sekine, Manabu, Design Method for An Automotive Laser Radar System and Future Prospects for Laser Radar, 7/92, pgs. 120-125; Rock, Denny, Intelligent Road Transit: The Next Generation, AI Expert, 4/94, pgs. 17-24; Teuber, Jan, Digital Image Processing, Prentice Hall, N.Y., 1989; Graefe, Volker, Vision for Intelligent Road Vehicles, 7/92, pgs. 135-140; Enkelman, W., Realization of Driver's Warning Assistant for Intersections, 7/92, pgs. 72-77; Efenberger, Wolfgang, Automatic Recognition of Vehicles Approaching From Behind, 7/92, pgs. 57-62; Rossle, S., Real-Time Vision-Based Intersection Detection for a Driver's Warning Assistant, 7/92, pgs. 340-44 each of which is incorporated herein by reference in its entirety. However, these systems fail to provide such back-up scanning and multiple target detection and tracking as part of an integrated GPS collision avoidance and warning system capable of multiple target, logic, higher accurate, train-on-the-track, operational environment.

FIELD OF THE INVENTION

This invention relates to methods and apparatus used in railway systems for the detection of a collision candidate, such as a forward or rearward approaching train or other track-occupying vehicle, and more particularly to the automated invocation of collision avoidance measures.

The invention further relates generally to an apparatus and method of precisely determining the actual position and attitude of a host train operating on a select course or path (a railway track) and of multiple moving or fixed targets (trains), which represent potential collision hazards with a host train, and, then, generating and displaying warning signals and avoidance response to avoid the collision and, in the absence of effective timely action by the host operator (the train driver), automatically controlling the host train to avoid the collisions and damage there from. More particularly, the invention relates to the use of a Global Positioning System ("GPS"), as the primary host train and target locating system with what available accuracy, on a second communication link from one of a plurality of stations having a known fixed position on the surface of the track (track transponders) range signals, for positive track identification and including correction signals for correcting errors in the GPS ranging signals for assistance in making further measurements for still further improving the accuracy of the GPS ranging signals, further supplemented by any of a plurality of conventional digital computer systems to detect, recognize, track and predict the collision impact point of all relevant potential targets (other trains using the track). The invention further relates to multiple antennae, GPS determined train attitude for use in generating train-on-the-track, multiple target relative location, and collision avoidance warnings and responses. More particularly, the invention further relates to an inter-train and train for transmitting GPS, position data, as well as, relevant target data to other trains and central or local control centres for information and control action. More particularly, the present invention still further relates to the use of neural networks and logic rule sets for generating and developing optimal and prioritised warning and avoidance responses, and generating related optimally coordinated control signals for all relevant host train control systems which are then automatically implemented, subject to operator intervention and override, to avoid collisions or to optimise prevention of injury or damage.

There are occasional collisions of trains that occur even though most locomotives are equipped with voice communication systems that should enable the engineers to detect collision candidates in time to initiate collision avoidance measures. There have been efforts to provide methods and apparatus that will detect and automatically avoid train collisions. The present invention present proposed solutions to the long-standing problem of vehicular collisions, some of them catastrophic, including collisions between trains. In train networks, there are provided radio communications so that a driver may contact another driver for a variety of operational reasons. In addition, transponders provide area codes for a particular location which enables train drivers to identity their positions. In the event of a danger or breakdown all drivers may be alerted by an all points broadcast via the central broadcast. In general terms the known systems employ either a track system circuit for positional control, an axle counter system for single lines or a loop system. There are therefore existing methods to warn drivers of impending danger or simply to allow communications between drivers to warn for instance of a sick passenger. However these methods are subject to human error, are inefficient and are labor intensive.

SUMMARY OF INVENTION

One aspect of the invention is a computer controlled collision avoidance and warning method which includes the steps of receiving continuously from a network of satellites on a first communication link at one of a plurality of trains GPS ranging signals for initially accurately determining the one's position on a track on a surface of the earth; receiving continuously at the one train on a second communication link from one of a plurality of stations having a known fixed position on the surface of the track (track based transponders) for positive track identification and correcting propagation delay errors in the GPS ranging signals and for still further improving the accuracy of the GPS ranging signals and of determining the one's position on a track on a surface of the earth; determining continuously at the one train from the GPS, the one's kinematic tracking position on the surface of the track augmented with neural networks to provide higher accuracy . . . , communicating the one's status information including the kinematic tracking position to each other one of the plurality of trains and to the plurality of train control centres, and receiving at the one train each of the others' of the plurality of train status information including the others' kinematic tracking position; determining in a logic associative memory (LAM) the one's response relative to each collision hazard; generating control signals for actuating an override control mechanism, that interface with train controls, to stop the train/s short of a collision; intelligibly indicating a warning of a collision hazard; and, co-ordinately actuating the real-time logging of train characteristics in real time sufficiently in due time to avoid each collision hazard;

The present invention provides moving train collision avoidance, warning and control systems and methods using GPS satellite location systems augmented with neural networks to provide higher location accuracy, and to derive train attitude and position coordinates and one's kinematic tracking information. Ground based controller computers are used to communicate with trains for the purpose of receiving location and train status information and broadcasting control information to respective trains, such GPS location and computing systems being integrated with track transponders scanning and on-board Train Navigation Unit (TNU) to provide accurate train location information together with information concerning impending collision situations for each train. The present invention and method disclosed herein will measure beneficially high in Safety and Environmental areas and will make the train controllers in more control and the train operators, proactive rather reactive.

A further enhancement of the Train Navigation and Control System (TNCS) and method disclosed herein makes use of an essential tool for the train controller to stop the one train, or any other train, remotely, that will be introduced for the first time ever, to enable the train controller to prevent a disaster/s from happening, in such cases as:

stopping a break away trains, speeding trains towards a derailed train or other disaster areas with no means to warn the train crew of a wrong running direction train, incapacitated driver or in fog, smoke or blind spots such as bends. This feature can be accommodated by the introduction of Central Control Unit (CCU).

Real-time Logging of Train Characteristics

Yet, a further enhancement of the Train Navigation and Control System (TNCS) and method disclosed herein makes use of a real-time logging of train characteristics system to record the last several minutes of driving action for future analysis. Such recordings permit reconstruction of events leading up to collision permitting more accurate determination of causes including fault.

In a broad form of the system aspect the present invention comprises;

a computer controlled vehicle collision avoidance and warning system; the system comprising:

a central controller;

at least one satellite providing a first communication link between the at least one satellite and at least one Global Positioning System (GPS) to determine a position of a first vehicle;

a second communications link allowing communications between at least one fixed station and a first said vehicle;

wherein said second communications link provides continual communications between said at least one fixed transponder station and at least one of a potentially unlimited number of other vehicles; wherein, said first communications link provides a location of any one said vehicles via GPS and wherein the communications between TNUs on each vehicle provides a location of one vehicle relative to at least one other vehicle.

In its broadest form, the present invention comprises:

a computer controlled vehicle collision avoidance and warning system; the system comprising:

at least one satellite in communication with at least one Global Positioning System (GPS device) providing a first communication link between the at least one satellite to determine a location of at least a first vehicle;

a second communications link allowing communications between at least one fixed station and at least a first said vehicle;

wherein said second communications link provides continual communications between said at least one fixed station and at least one of a potentially unlimited number of other vehicles; wherein, said first communications link provides a location of any one said vehicles and said second communications link provides a location of one vehicle relative to at least one other vehicle via processing means in each said at least one vehicle.

Preferably, each fixed stations are located at a known position on a vehicle path and at a predetermined distance from each other wherein each said fixed station includes a transponder which emits a range signal to the processing means in each vehicle for path identification. According to a preferred embodiment, each said vehicle is a train traveling on a track network and the processing means comprises a train navigation unit (TNU). The system further comprises in association with said train navigation unit a main control unit; wherein the train navigation unit communicates with the main control unit to enable a comparison between train location data received via the first communication link and train location data received from the second communications link. The system preferably comprises a central controller for remote monitoring of the system; wherein at least one of the satellites communicates with a train based GPS or a GPS associated with said central controller. Each fixed transponder station emits correction signals for correcting errors in GPS ranging signals from the first communications link wherein the correction signals allow further correction measurements for improving the accuracy of the GPS ranging signals. Track identification is computer processed in conjunction with the controller to continuously determine a kinematic tracking of a train for position identification; wherein a tracked position of one train is communicated to or received by at least one other train in real time to allow each train to determine a distance of separation from at least one other train. Preferably, there is a network of satellites which transmit continually to a GPS for allowing a determination of a train on a rail track.

Preferably the range signals from each transponder allow determination of a first train position relative to another train for determination of a collision hazard.

In the event of a collision hazard a response control signal is generated for actuating an override control mechanism, which communicates with train controls, to stop the train/s short of a collision. Processing of the location information of each said trains may be provided by a neural network which identifies and evaluates each potential collision hazard of one train relative to another train. Train navigation units (TNU's), provide real-time logging of train characteristics and allow determination of train location, length, velocity, speed relative to at least one other train. Preferably, the system further comprises alert means for alerting an operator of one train at one location to the presence of at least one other train at another location.

The potential energy of a train in the network may be determined by reference to the known formula:

$$P.E. = (xEOB) + Fb(xEOB - x) = \frac{1}{2}mv^2(x) + P.E.(x)$$

where $Fb$ is a braking force assumed constant at full service application $M$ is total train mass $V$ is velocity at start of braking $P.E.$ is the potential energy of the train $= \sum_n w_n h_n$ $n$ is the number of cars and locomotives The calculated potential energy determines quantum of braking effort to avoid a collision.

The system also includes a train GPS radio assembly including a GPS interface sub system and a train navigation unit communication subsystem; wherein both said subsystems are in communication with a transceiver.

Preferably the system includes an override control including;
- a signal input,
- a detection signal analysis means;
- a data source
- a logic associative memory in communication with a control signal generator, wherein said control signal generator is capable of emitting a signal responsive to input data to override train controls to effect braking in the event of a collision risk. The central controller is capable of monitoring train locations over a range of approximately 600 kms.

In another broad form the present invention comprises:
a computer controlled train collision avoidance and warning system; the system comprising:
at least one satellite in communication with at least one Global Positioning System (GPS device) providing a first-communication link between the at least-one satellite to determine a location of at least a first train;
a second communications link allowing communications between at least one fixed transponder station and at least a first said train;
wherein said second communications link provides continual communications between said at least one fixed transponder station and at least one of a potentially unlimited number of other trains; wherein, said first communications link provides a location of any one said vehicles and said second communications link provides a location of one train relative to at least one other train via processing means in each said at least one train.

In another broad form the present invention comprises:
a computer controlled train collision avoidance and warning system; the system comprising:
at least one satellite in communication with at least one Global Positioning System (GPS device) providing a first communication link between the at least one satellite to determine a location of at least a first train;
a second communications link allowing communications between at least one fixed station and at least a first said train;
wherein said second communications link provides continual communications between said at least one fixed transponder station and at least one of a potentially unlimited number of other trains; wherein, said first communications link provides a location of any one said vehicles and said second communications link provides a location of one train relative to at least one other train via processing means in each said at least one train;
wherein said second communications link provides continual communications between said at least one fixed transponder station and at least one of a potentially unlimited number of other trains; wherein, said first communications link provides a location of any one said trains and said second communications link allows determination of a location of one train relative to at least one other train; wherein the system further comprises;
- a signal input,
- a detection signal analysis means;
- a data source
- a logic associative memory in communication with a control signal generator, wherein said control signal generator is capable of emitting a signal responsive to input data to override train controls to effect braking in the event of a collision risk.

Preferably a central controller is capable of communication with at least one of the satellites to monitor train location and to issue a warning in the event of a collision risk.

In another broad form according to a method aspect the present invention comprises:
a method of preventing vehicle collisions comprising;
a computer controlled vehicle collision avoidance and warning system; the system comprising:
at least one satellite in communication with at least one Global Positioning System (GPS device) providing a first communication link between the at least one satellite to determine a location of at least a first vehicle;
a second communications link allowing communications between at least one fixed station and at least a first said vehicle;
wherein said second communications link provides continual communications between said at least one fixed station and at least one of a potentially unlimited number of other vehicles; wherein, said first communications link provides a location of any one said vehicles and said second communications link provides a location of one vehicle relative to at least one other vehicle via processing means in each said at least one vehicle;
the method comprising the steps of:
a) using the first communication link to provide a location of a first vehicle;
b) activating a GPS radio system including a GPS interface and a communication subsystem;
c) placing track identification means at predetermined track locations to provide signals of track identification to vehicles;
d) receiving input data relating to train operation and environment parameters
e) analyzing said data via a logic associative memory; to determine a collision risk between at least two vehicles;
f) activating an override signal responsive to a collision risk in the event that one train is on a collision course with another train.

The method comprises the further step of allowing each vehicle to receive a signal indicative of a predetermined location on a vehicle path.

The method includes the preliminary step of locating at each fixed station, transponders on a vehicle path at a known position and at a predetermined distance from each other;
wherein, each transponder emits a range signal for path identification; wherein the path is a road or a railway track.

Each fixed transponder station emits correction signals for correcting errors in GPS ranging signals from the first communications link; wherein the correction signals allow further correction measurements for improving the accuracy of the GPS ranging signals The method comprises the further step of providing a central controller for monitoring vehicle locations and capable of transmitting an override signal to vehicles to actuate a collision avoidance feature. According to one embodiment, the method comprises the further step of processing positions of each vehicle received and/or transmitted to each vehicle via a neural network; wherein the neural network identifies and evaluates each potential collision hazard of one train relative to another train.

A network of satellites transmit continually to a GPS for allowing a determination of a train on a rail track. Transponder range signals to allow determination via the neural network in a logic associative memory (LAM) of a first train position relative to another train for determination of a collision hazard. In the event of a collision hazard a response control signal is generated for actuating an override control mechanism, which communicates with train controls, to stop the train/s short of a collision.

In another broad form of a method aspect, the present invention comprises:

a method for operating a collision warning and avoidance system comprising the steps of:

a) providing a network of satellites capable of continuous communications via a first communications link with one or more of a plurality of trains b) ranging signals for initially accurately determining a train position on a rail track, c) receiving continuously a signal at each said train via a second communication link from one of a plurality of transponder stations having a known fixed position on the surface of the track;

d) determining in a logic associative memory (LAM) a response which generates control signals, that actuate an override control mechanism, that influences train controls to stop the train/s short of a collision in the event of a detected collision risk.

The method preferably, comprises the further step of real-time logging of train characteristics to record the last several minutes of driving action to thereby enable reconstruction of events leading up to a collision.

A train navigation unit (TNU) provides remote train control override for a train controller to stop at least one train in the event of a collision risk.

In another broad form of a method aspect, the present invention comprises:

a method of preventing train collisions comprising;

a computer controlled collision avoidance and warning system; the system comprising:

at least one satellite in communication with at least one Global Positioning System (GPS device) providing a first communication, link between the at least one satellite to determine a location of at least a first train;

a second communications link allowing communications between at least one fixed transponder station and at least a first said train;

wherein said second communications link provides continual communications between said at least one fixed transponder station and at least one of a potentially unlimited number of other trains; wherein, said first communications link provides a location of any one said trains and said second communications link provides a location of one train relative to at least one other train via processing means in each said at least one vehicle; the method comprising the steps of:

a) activating a GPS radio system including a GPS interface and a communication subsystem;

b) using the first communication link to provide a location of each one of a plurality of trains;

c) receiving at a main control unit input data relating to train operation and environment parameters d) analyzing said data via a logic associative memory; to determine a collision risk between at least two trains;

e) activating an override signal responsive to a collision risk in the event that one train is on a collision course with another train.

In another broad form according to a method aspect the present invention comprises:

a method of preventing vehicle collisions using a system comprising;

a computer controlled vehicle collision avoidance and warning system; the system comprising:

at least one satellite providing a first communication link between the at least one satellite and at least one Global Positioning System (GPS device) to determine a location of a first vehicle;

a second communications link allowing communications between at least one fixed transponder station and at least a first said vehicle;

a central controller;

wherein said second communications link provides continual communications between said at least one fixed transponder station and at least one of a potentially unlimited number of other vehicles; wherein, said first communications link provides a location of any one said vehicles and the communications between train navigations units (TNUs), provides a location of one vehicle relative to at least one other vehicle the method comprising the steps of:

a) using the first communication link to provide a location of a first vehicle;

b) activating a GPS radio system including a GPS interface and a communication subsystem;

c) receiving input data relating to train operation and environment parameters;

d) placing track identification means at predetermined track locations to provide signals of track identification to vehicles;

e) analyzing said data via a logic associative memory to determine a collision risk between at least two vehicles;

f) activating an override signal responsive to a collision risk in the event that one train is on a collision course with another train.

DESCRIPTION OF THE DRAWINGS

The present invention will now be described in more detail with according to a preferred but non limiting embodiment and with reference to the accompanying illustrations wherein;

FIG. 1 shows a schematic layout of a train navigation and control system (TNCS) according to one embodiment;

FIG. 2 shows a first communication link being a GPS receiver and a second communication link being a GPS transceiver each operating on separate predetermined frequencies.

FIG. 5 shows a schematic layout of a typical procedure for processing and analyzing inputs and transmitting data derived from those inputs.

FIG. 6 shows a plan view of a typical track and trains arrangement including a Transponder Identification Subsystem (TIS) capable of interaction with a train to sense track mounted transponders, which provide the exact location of the train relative to the transponders.

FIG. 7 shows a plan view of an arrangement of fixed point transponders 33 for determining, using a scanner supported on a train, particular track identification.

FIG. 8 shows a schematic layout of a GPS interface subsystem and TNU communication subsystem and software module.

FIG. 11 shows a graphical representation of an algorithm for processing an input signal responsive to train parameters such as minimum braking distance of a train according to predetermined train parameters.

FIG. 14 shows a main control unit (MCU) is featuring neural networks to process and analyze received data and information for analysis to calculate parameters such as speed, direction and location of a train.

FIG. 15 shows schematic inputs and outputs of a known neural network.

FIG. 16 shows graphical relationships for connecting the outputs of a first node layer to a third node layer through a second connection layer; and combining the outputs of the second node layer to provide receiver position data FIG. 17 shows a graphical arrangement providing a comparison between output signals to a desired signal to produce an error signal; and applying the error signal to a training algorithm to determine a weight.

FIG. 18 shows a schematic layout of a train navigation unit and relationships with operation parameters according to one embodiment of the invention.

DETAILED DESCRIPTION OF INVENTION

Figure 3:
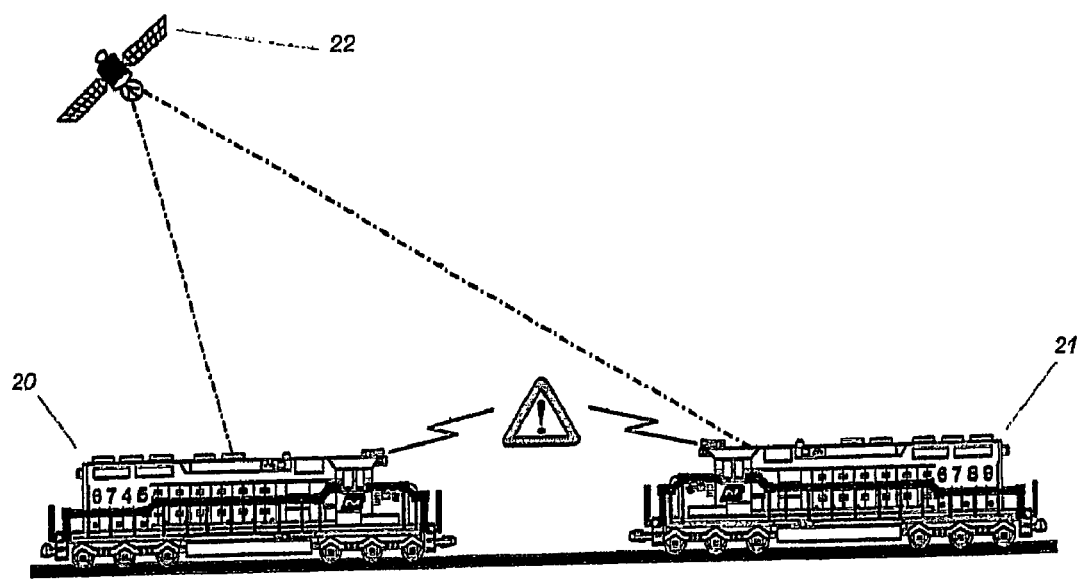
FIG. 3 shows a schematic of typical trains in a network the receiving information from one another on parameters associated with the operation of the other train.

The present invention in one broad form provides a computer controlled collision avoidance and warning system in which signals are received by at least one vehicle on a first communication link from a GPS satellite link for determining the position of that vehicle. The invention further provides a second communications link in which at least one of a plurality of vehicles receive continuously a signal concerning the position of at least one other vehicle so that each vehicle known the position of another vehicle so that evasive action may be taken in the event of a collision. The first communications link is a GPS receiver and the second communications link is a GPS transceiver each operating on separate predetermined frequencies. (see FIG. 2).

Although the present invention will be described with reference to its application to train collision warning it will be appreciated by persons skilled in the art that the invention has applications for vehicle collision management in a variety of areas other than train infrastructure networks.

FIG. 1 shows a schematic layout of a train navigation and control system (TNCS) according to one embodiment. The TNCS includes a Global Positioning System 1 comprising (at least one) satellite 2 which communicates with a transceiver 3 located in at least one train 4. Each train has a Main Control Unit 5, a train communication subsystem 6 and GPS interface subsystem 7. GPS interface subsystem 7 communicates with GPS satellite 2 for the purpose of establishing positional data for train 4. This constitutes a first communication system. Working in conjunction with the first communication system is a second communication system which eventually allows one train to communicate via a communications link 8 with at least one other train via a Central Control Unit (CCU) 9. The second communications link provides train location and operational parameter data for analysis by the central control unit so this information may be available to another train for the purpose of collision avoidance. This is effected by use of a train navigation unit and main control unit which are in mutual communication. Referring to the Train navigation unit of FIG. 1 there is provided according to one embodiment, a host computer system associated with the Central Control Unit (CCU), having at least one application program located at the train controller facility 9, that controls the area in which a local host user, on-board TNU interface is located.

A host transceiver system, includes means for gathering output from the CCU 9 and means for providing input into the host computer system. A train controller interface is coupled to the host computer system at the CCU 9. A redundant user interface configured to be used in at least one remote location, the TNU on-board. The controller interface includes means for producing output gathered by the host transceiver system from the host computer system. The controller interface also includes means for gathering user input for insertion by the host transceiver system into the host computer system.

FIG. 2 shows a schematic layout of the main hardware for the first and second communications links. The first communications link comprises a potentially unlimited number of satellites but in the case of the embodiment of FIG. 2 there are four satellites 10, 11, 12 and 13. Satellite 10 is capable of communication via a first communication link 14 to a GPS receiver on board train 15 or to a central control center 16. A radio link 17 allows communication via communications tower 18 between train controller 16 and (at least one) train 15. Train controller 16 is in communication with each train via control link 19. GPS transceivers associated with each train each operate on separate predetermined frequencies. A communications link capable of communicating to and from the at least one remote location is configured to send output gathered by a host transceiver system to the controller interface. The communications link is also configured to send input gathered by the controller interface to the host transceiver system.

FIG. 3 shows a schematic of typical trains 20 and 21 in a network receiving information from one another on parameters associated with the operation of the other train. Primary communications is via at least one satellite 22. Thus each train will know at any time the location of at least one other train and particularly a train on a collision course with the train.

Figure 4:
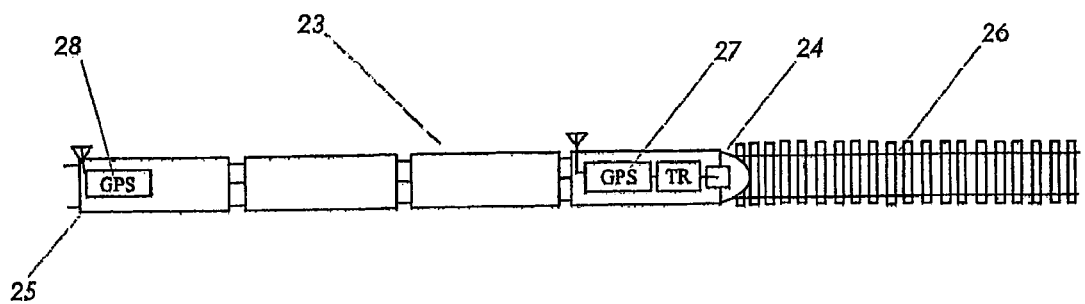
FIG. 4 shows a plan view of a train and track assembly including a GPS subsystem interface unit fitted to the train.

FIG. 4 shows a plan view of a train 23 having a leading end 24 and a trailing end 25. Train 23 travels on track 26 and includes a first GPS subsystem 27 and a second GPS subsystem unit 28.

FIG. 5 shows a schematic layout/data flow chart of a typical procedure for processing and analyzing inputs and transmitting data derived from those inputs. The analysis includes analyzing train's attitude, and the compensating attitude response once GPS data has been acquired. According to one embodiment, once GPS data has been acquired, the following information is obtained: speed, direction, track ID, train ID. Acquired data is then formatted and transmitted for processing. The analysis further comprises: analyzing inputs of characteristics of each and every individual train.

FIG. 6 shows a plan view of a typical track 30 with trains traveling in opposition poll arrangement including a Transponder Identification Subsystem (TIS) capable of interaction with a train to sense track mounted transponders 31. The TIS provides an interface for the train 29 to sense fixed position transponders 31 mounted on track 30. The TIS identifies precisely the transponder which the train is approaching or passing. So that the precise location of the transponder may be determined. The attitude of train 29 (kinematic position) may be determined continuously relative to a fixed point on surface of track 30 by transponders 31. This may be achieved by use of a scanner (not shown) at train extremities and comparing GPS signals simultaneously received at a scanner antennae. The TIS maintains an up to date data base of all transponders, their location and the Track ID on which they are located.

FIG. 7 shows a plan view of an arrangement of fixed point transponders 33 for determining, using a scanner supported on a train, for particular track identification.

FIG. 7 shows different track identities. For instance transponders 36-39 represent tracks A (32), B (33), D (34) and C (35) respectively.

FIG. 8 shows a schematic layout of a GPS interface subsystem and TNU communication subsystem and software module. GPS Interaface subsystem (GIS) 40 accepts inputs from GPS satellites (see FIG. 2). GIS 40 includes a receiver/transmitter 41 and 42 respectively and a software module. The software module manages communications between the GPS unit and all other system components thereby providing the necessary data caching and timing. Preferably the software module reads satellite data every 30 seconds. GIS 40 calculates the position of the train, its speed based on the information received and the time of day. Train communication subsystem TCS 43 broadcasts train information every 1 minute and includes train identification, current position, speed, direction and track identification. This information is provided by each train and is available to each other train in the network via a central control unit. Train communication subsystem works as a master TCS for one train with all other on board components of the system acting as back up for the master TCS. This is achieved through the election and elimination mode as shown in FIG. 9.

Figure 9:
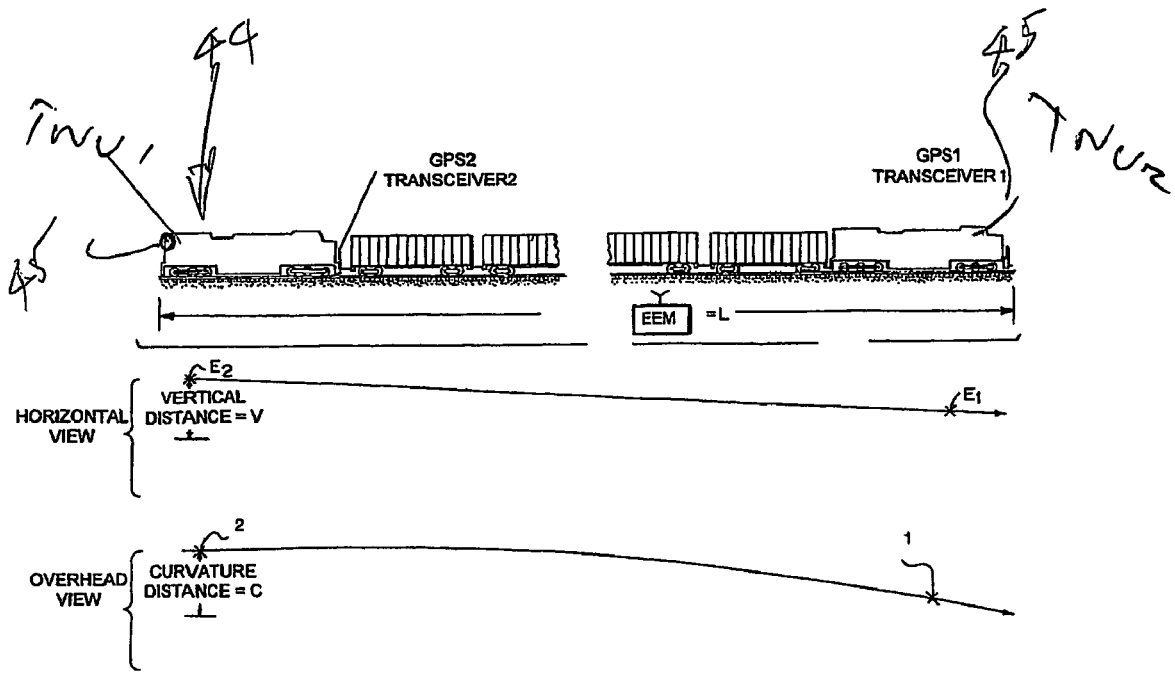
FIG. 9 shows one train having 2 TNUs: GPS transceivers preferably front and rear for the purpose of determining the length of the train.

FIG. 9 shows a train 44 of indefinite length L having a transceiver 45 at one end and a transceiver 46 at an opposite end. These transceivers allow determination of the length of train 44.

TCS units on one train will elect one unit as a master TCS for that train so that all remaining units of the on board system will be back up for the TCS. The TCS comprises Communications include communicating the status information of one selected train and the receiving step includes receiving status information on another train. Each train is engaged in association with the central controller of receipt and transmission of information which is processed at the central controller for collision risk analysis. Train 44 of FIG. 9 includes train navigation unit (TNU) election and elimination mode (EEM) for determination of a train length comprise The TCS (see FIG. 8) works as a master TCS for one train and all other on-board units will work as backup for the master TCS. This is achieved through the election and elimination mode (EEM).

The TCS units on the same train have to elect one unit to work as master TCS for that train and all other units will work as backup for the mater TCS.

The EEM is enabled automatically when the TNU units are turned on or when the master TCS unit no longer broadcasts the train information. The TCS accurately calculates the exact length of the train even after amalgamating or dividing the one train. This reduces labor and helps to streamline the operation of the TNCS.

Figure 10:
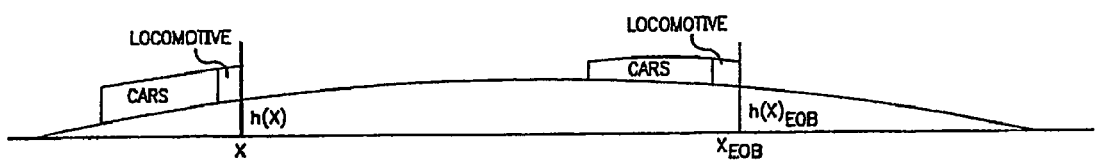
FIG. 10 shows a known formula for determining potential energy of a train from parameters such as relative velocity between two trains, track topography on which the one train is traveling, to determining braking effort.

The TCS comprises a time lock feature in the one train stationary status, for example laps (X) minutes, to cancel this mode FIG. 10 shows a formula for determining potential energy (PE) of a train from parameters such as relative velocity between two trains, track topography on which the one train is traveling, i.e. Steep grade, downhill or flats. This enables calculation of train parameters so that collision risk can be determined by any train at any time based on a wide variety of train parameters such as but not limited to, Braking force (assumed constant at full service application), train mass, velocity at the start of braking, the number of cars and locomotives which make up the train. The calculated potential energy may multiply by a safety factor designed on a brake condition (such as overheated or frequently used brakes, wear of brake shoes).

FIG. 11 shows a graphical representation of an algorithm for processing an input signal responsive to train parameters such as velocity and minimum braking distance of a train according to predetermined train parameters.

Figure 12:
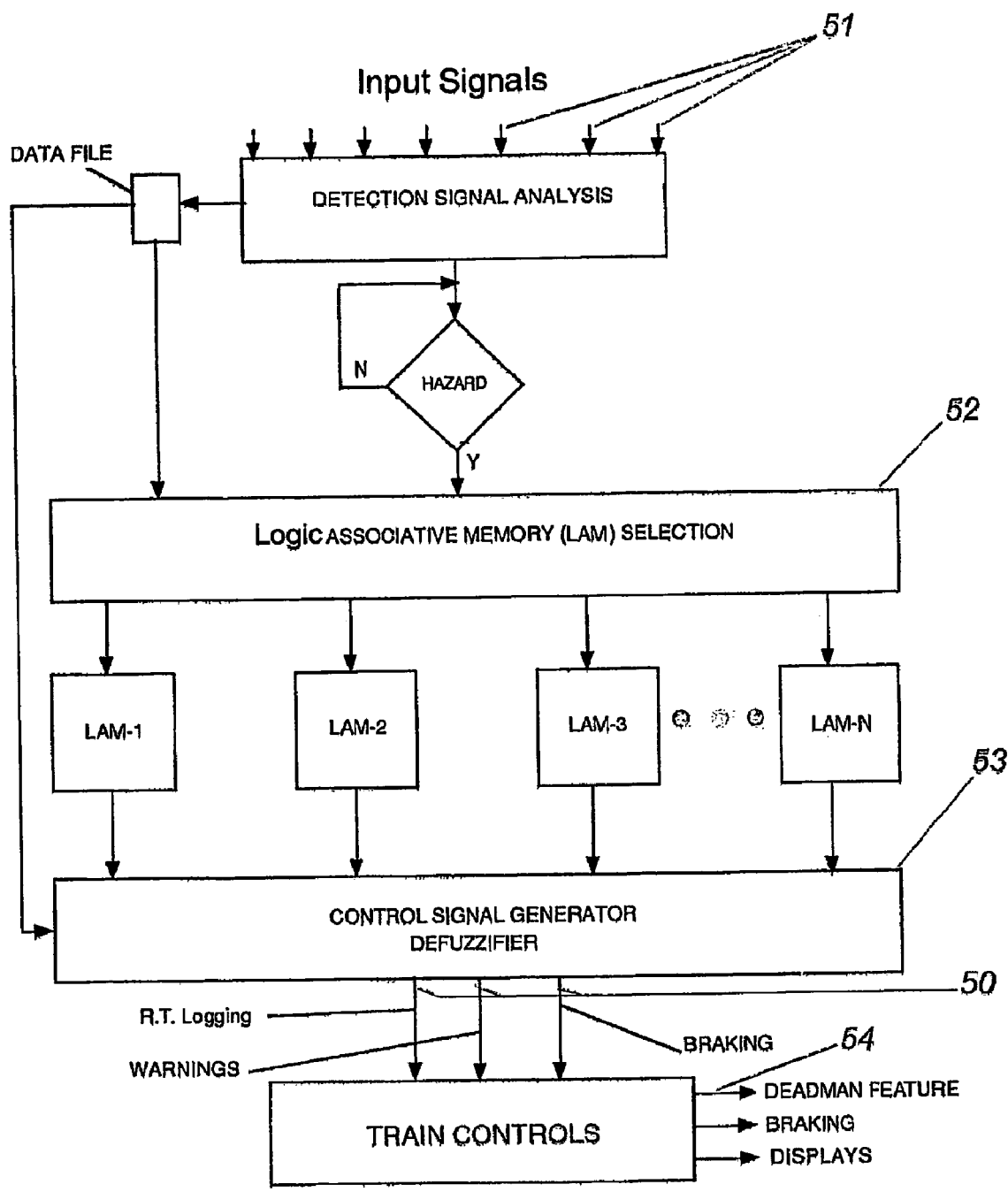
FIG. 12 shows a schematic layout of an interface between input signals a logic associative memory and train controls which provides control signals, that actuate an override control mechanism, that interface with train controls, to stop the train/s short of a collision.

FIG. 12 shows a schematic layout of an interface 50 between input signals 51, a logic associative memory 52 and train controls which provides control signals via a control signal generator 53, that actuate an override control mechanism, that interface with train controls, to stop the train/s short of a collision. According to one embodiment, override control signal generator activates a micro switch (not shown) that activates known dead man mechanism 54 or like train feature to disable a train throttle or the like in one train. The override will stop the train by reducing the brake pipe pressure to maximize the brake cylinder pressure.

Figure 13:
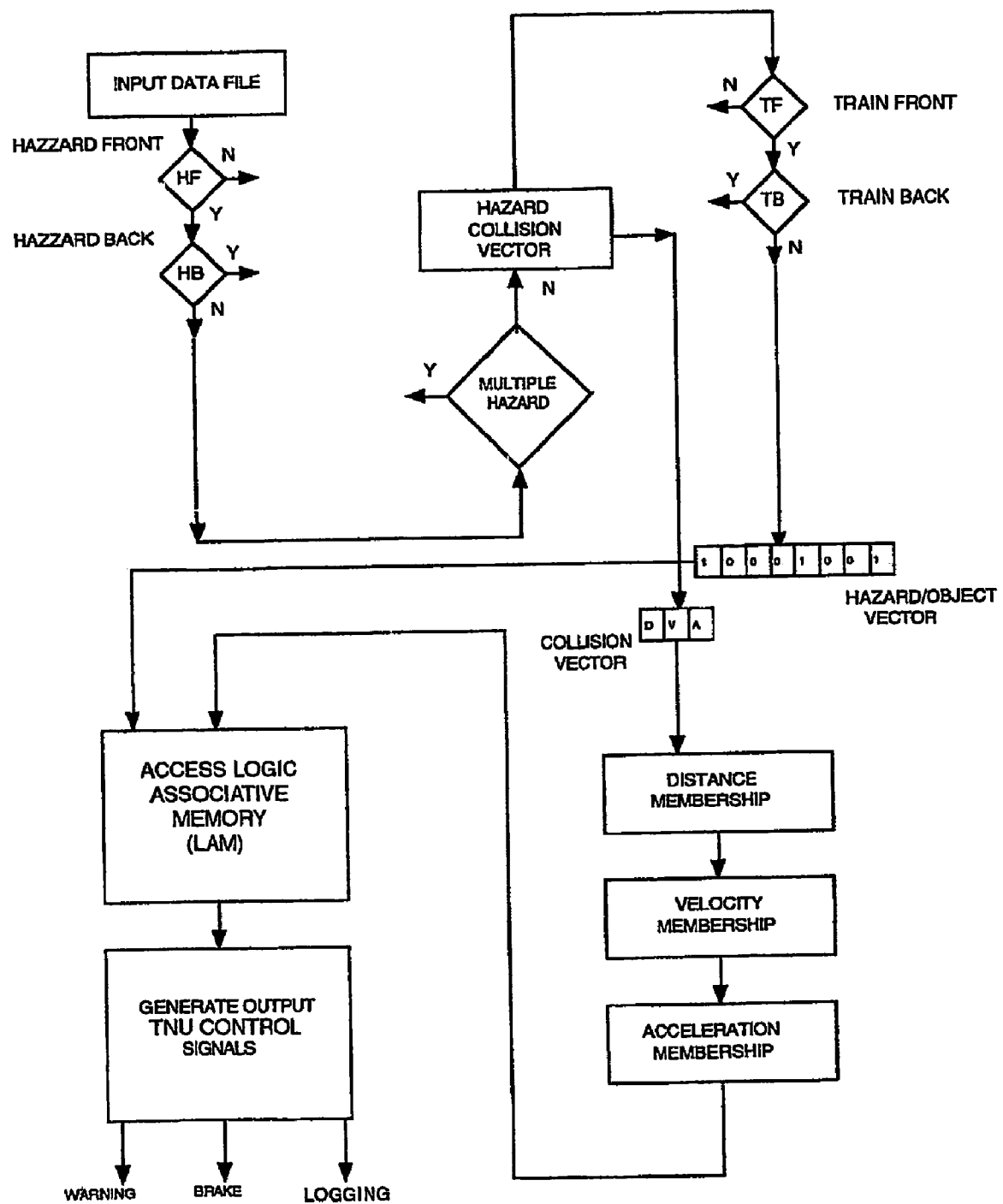
FIG. 13 shows a schematic layout of a process for determining a hazard vector and collision vector and analyzing both vectors for generating output signals for preventing a collision.

FIG. 13 shows a schematic layout of a process for determining a hazard vector and collision vector and analyzing both vectors for generating output signals for preventing a collision. The analysis involves calculating a collision vector for each collision hazard and determining a collision avoidance procedure. Warning indication involves warning the driver of one train of a TNU response and actuating an override control mechanism (see arrangement of FIG. 12), should a collision remain imminent at the end of a warning period. The warning may be implemented by visually indicating to the driver of one train on an LC display on the relevant train. A warning may also be implemented by actuating a collision warning light and/or sound system.

FIG. 14 shows a main control unit (MCU) is featuring neural networks to process and analyze received data and information for analysis to calculate parameters such as speed, direction and location of a train.

FIG. 15 shows a schematic of inputs and outputs of a neural network used as an intelligence to "learn" data for use in the system FIG. 16 shows graphical relationships for connecting the outputs of a first node layer to a third node layer through a second connection layer; and combining the outputs of the second node layer to provide receiver position data The neural network improves the accuracy of data from the GPS signals for more accurate determination of train position. The method comprises receiving input signals via a GPS receiver from at least one of GPS satellite. The input signals comprise satellite-related navigation information. The input signals are connected to the second node layer through the first node layer and the first connection layer. The outputs of the second node layer to the third node layer are connected to the second connection layer. The outputs are connected to the second node layer to provide receiver position data as shown in FIG. 16. Weighting the second connection layer comprises: comparing the output signals to a desired signal to produce a position error signal; and applying the error signal to a training algorithm to determine a weight as shown in FIG. 17.

FIG. 17 shows a graphical arrangement providing a comparison between output signals to a desired signal to produce an error signal; and applying the error signal to a training algorithm to determine a weight.

FIG. 18 shows a schematic layout of a train navigation unit and relationships with operation parameters according to one embodiment of the invention. As can be seen from the schematic of FIG. 18, at the heart of the invention is the train navigation unit (TNU) which is linked to all facets of the collision avoidance and warning system. A wide number of train and train environment parameters are catered for to enable calculation of collision risk via primary and secondary communications links. The environmental parameters include topography and global positioning location and track identification.

Train parameters include train identification, braking data, velocity, acceleration, speed, weight, length of train. The train communication subsystem comprises a time lock feature in the one train stationary status, for example laps (X) minutes, to cancel this mode automatically. TCS accurately calculates the exact length of the train after amalgamating or dividing the one train. This minimises human interaction and helps to streamline the operation of the TNCS.

Variable TNU inputs due to changing of the characteristics of an individual train or its surrounding moving environment will result in variable TNUs' calculations which will allow the TNU to deactivate when the potential hazard disappears or is eliminated by changing the track (X-over) or the one train speed is brought under control by the driver or by clearing the Signal ahead. This feature will allow the TNU not to bring the one train to a complete stand before releasing the brakes and pick-up speed again, which will achieve smooth riding and a power saving Train Managing System as well as maintaining the timetables and enforce the safe working procedures by controlling the train speed to take place in X-overs and on peak hour's movements (when the Trains are closely following each other).

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A computer controlled train collision avoidance and warning system; the system comprising:
   at least one satellite in communication with at least one Global Positioning System device providing a first communication link between the at least one satellite to determine a location of at least a first train;
   a second communications link allowing communications between at least one fixed station and at least a first said train;
   wherein said second communications link provides continual communications between said at least one fixed station and at least one of a potentially unlimited number of other trains; wherein, said first communications link provides a location of any one said trains and said second communications link provides a location of one train relative to at least one other train via processing means in each said at least one train; wherein, each said fixed stations are located at a known position on a rail track and at a predetermined distance from each other; wherein, each said fixed station includes a transponder which emits a range signal to said processing means in each train for track identification; and
   wherein each fixed transponder station further emits correction signals for correcting errors in Global Positioning System signals from said first communications link to enable determination of exact track separation of trains on a track network allowing for respective train lengths and track curvature.

2. A system according to claim 1 wherein said correction signals allow further correction measurements for improving the accuracy of the Global Positioning System ranging signals.

3. A system according to claim 2 wherein the processing means comprises a train navigation unit.

4. A system according to claim 3 further comprising in association with said train navigation unit a main control unit.

5. A system according to claim 4 wherein the train navigation unit communicates with said main control unit to enable a comparison between train location data received via said first communication link and train location data received from said second communications link.

6. A system according to claim 5 further comprising a central controller for remote monitoring of said system.

7. A system according to claim 6 wherein, each said at least one satellite communicates with a train based Global Positioning System or a Global Positioning System associated with said central controller.

8. A system according to claim 7 wherein path identification is computer processed in conjunction with said controller to continuously determine a kinematic tracking of a train for position identification.

9. A system according to claim 8 wherein a tracked position of one train is communicated to or received by at least one other train in real time to allow each said trains to determine a distance of separation from at least one other train.

10. A system according to claim 9 wherein there is a network of satellites which transmit continually to a Global Positioning System for allowing a determination of a position of a train on a rail track.

11. A system according to claim 10 wherein range signals from each said transponder allow determination of a first train position relative to another train for determination of a collision hazard.

12. A system according to claim 11 wherein, in the event of a collision hazard a response control signal is generated for actuating an override control mechanism, which communicates with train controls, to stop the trains short of a collision.

13. A system according to claim 12 wherein the processing of said location information of each said trains is provided by a neural network which identifies and evaluates each potential collision hazard of one train relative to another train.

14. A system according to claim 13 wherein said train navigation units provide real-time logging of train characteristics.

15. A system according to claim 14, further comprising means for determining train location, length, velocity, speed relative to at least one other train.

16. A system according to claim 15, further comprising alert means for alerting an operator of one train at one location to the presence of at least one other train at another location.

17. A system according to claim 16 wherein the potential energy of a train in said network is determined by reference to the formula:

$$P.E. = (xEOB) + Fb(xEOB - x) = \frac{1}{2}mv^2(x) + P.E.(x)$$

where $Fb$ is a braking force assumed constant at full service application, $M$ is total train mass, $V$ is velocity at start of braking, $P.E.$ is the potential energy of the train $= \sum_n w_n h_n$, and $n$ is the number of cars and locomotives.

18. A system according to claim 17 wherein the calculated potential energy determines quantum of braking effort to avoid a collision.

19. A system according to claim 1 further comprising a train Global Positioning System radio assembly including a Global Positioning System interface sub system and a train navigation unit subsystem; wherein both said subsystems are in communication with a transceiver.

20. A system according to claim 19 further comprising:
an override control including;
a signal input,
a detection signal analysis means;
a data source; and
a logic associative memory in communication with a control signal generator, wherein said control signal generator is capable of emitting a signal responsive to input data to override train controls to effect braking in the event of a collision risk.

21. A system according to claim 20 wherein a central controller is capable of monitoring train locations over a range of approximately 600 kms.

22. A computer controlled train collision avoidance and warning system; the system comprising:
at least one satellite in communication with at least one Global Positioning System device providing a first communication link between the at least one satellite to determine a location of at least a first train;
a second communications link allowing communications between at least one fixed station and at least a first said train;
wherein said second communications link provides continual communications between said at least one fixed transponder station and at least one of a potentially unlimited number of other trains; wherein, said first communications link provides a location of any one said trains and said second communications link provides a location of one train relative to at least one other train via processing means in each said at least one train;
wherein said second communications link provides continual communications between said at least one fixed transponder station and at least one of a potentially unlimited number of other trains; wherein, said first communications link provides a location of any one said trains and said second communications link allows determination of a location of one train relative to at least one other train; and
wherein each fixed transponder station further emits correction signals for correcting errors in Global Positioning System signals from said first communications link to enable determination of exact track separation of trains on a track network, allowing for respective train lengths and track curvature,
wherein the system further comprises;
a signal input,
a detection signal analysis means;
a data source; and
a logic associative memory in communication with a control signal generator, wherein said control signal generator is capable of emitting a signal responsive to input data to override train controls to effect braking in the event of a collision risk.

23. A system according to claim 22 further comprising a central controller capable of communication with at least one said satellites to monitor train location and to issue a warning in the event of a collision risk.

24. A system according to claim 23 wherein the central controller is capable of monitoring train locations over a range of approximately 600 kms.

25. A method of preventing train collisions comprising;
a computer controlled train collision avoidance and warning system; the system comprising:
at least one satellite in communication with at least one Global Positioning System device providing a first communication link between the at least one satellite to determine a location of at least a first train;
a second communications link allowing communications between at least one fixed station and at least a first said train;
wherein said second communications link provides continual communications between said at least one fixed station and at least one of a potentially unlimited number of other trains; wherein, said first communications link provides a location of any one said trains and said second communications link provides a location of one train relative to at least one other train via processing means in each said at least one train;
and wherein each fixed transponder-station further emits correction signals for correcting errors in Global Positioning System signals from said first communications link to enable determination of exact track separation of trains on a track network allowing for respective train lengths and track curvature,
the method comprising the steps of:
a) using the first communication link to provide a location of a first train;
b) activating a Global Positioning System radio system including a Global Positioning System interface and a communication subsystem;
c) placing train track identification means at predetermined track locations to provide signals of track identification to vehicles;
d) receiving input data relating to train operation and environment parameters;
e) analyzing said data via a logic associative memory to determine a collision risk between at least two trains;

f) activating an override signal responsive to a collision risk in the event that one train is on a collision course with another train;

g) locating at each said fixed station, transponders on the train track at a known position and at a predetermined distance from each other;

h) allowing each transponder to emit a range signal for track identification; and i) allowing the fixed station to emits correction signals for correcting errors in Global Positioning System ranging signals from said first communications link.

26. A method according to claim 25 wherein said correction signals allow further correction measurements for improving the accuracy of the Global Positioning System ranging signals.

27. A method according to claim 26 comprising the further step of communicating a tracked position of one train for receipt by at least one other train in real time to allow each said trains to determine a distance of separation from at least one other train.

28. A method according to claim 27 comprising the further step of providing a central controller for monitoring train locations and capable of transmitting an override signal to prevent a collision.

29. A method according to claim 28 comprising the further step of processing positions of each said trains received and/or transmitted to each said train via a neural network.

30. A method according to claim 29 wherein said neural network identifies and evaluates each potential collision hazard of one train relative to another train.

31. A method according to claim 30 comprising the further step of allowing transponder range signals to allow determination via said neural network in a logic associative memory of a first train position relative to another train for determination of a collision hazard.

32. A method according to claim 31 wherein, in the event of a collision hazard a response control signal is generated for actuating an override control mechanism, which communicates with train controls, to stop the trains short of a collision.

33. A method for operating a collision warning and avoidance system comprising the steps of:
 a) providing a network of satellites capable of continuous communications via a first communications link with one or more of a plurality of trains;
 b) ranging signals for initially accurately determining a train position on a rail track,
 c) receiving continuously a signal at each said train via a second communication link from one of a plurality of transponder stations having a known fixed position on the surface of the track;
 d) allowing each fixed transponder station to further emit correction signals for correcting errors in Global Positioning System signals from said first communications link to enable determination of exact track separation of trains on a track network allowing for respective train lengths and track curvature; and e) determining in a logic associative memory a response which generates control signals, that actuate an override control mechanism, that influences train controls to stop the trains short of a collision in the event of a detected collision risk.

34. A method according to claim 32 comprising an additional step of real-time logging of train characteristics to record the last several minutes of driving action to thereby enable reconstruction of events leading up to a collision.

35. A method according to claim 34 comprising the further step of providing a train navigation unit which provides remote train control override for a train controller to stop at least one train in the event of a collision risk.

36. A method of preventing train collisions comprising;
 a computer controlled collision avoidance and warning system; the system comprising:
 at least one satellite in communication with at least one Global Positioning System device providing a first communication link between the at least one satellite to determine a location of at least a first train;
 a second communications link allowing communications between at least one fixed transponder station and at least a first said train;
 wherein said second communications link provides continual communications between said at least one fixed transponder station and at least one of a potentially unlimited number of other trains; wherein, said first communications link provides a location of any one said trains and said second communications link provides a location of one train relative to at least one other train via processing means in each said at least one train;
 and wherein each fixed transponder station further emits correction signals for correcting errors in Global Positioning System signals from said first communications link to enable determination of exact track separation of trains on a track network allowing for respective train lengths and track curvature;
 the method comprising the steps of:
 a) activating a Global Positioning System radio system including a Global Positioning System interface and a communication subsystem;
 b) using the first communication link to provide a location of each one of a plurality of trains;
 c) placing track identification means at predetermined track locations to provide signals of track identification to vehicles;
 d) receiving at a main control unit input data relating to train operation and environment parameters
 e) analyzing said data via a logic associative memory to determine a collision risk between at least two trains; and
 f) activating an override signal responsive to a collision risk in the event that one train is on a collision course with another train.

* * * * *